US012770395B2

(12) United States Patent
Biswas et al.

(10) Patent No.: US 12,770,395 B2
(45) Date of Patent: Oct. 20, 2026

(54) PROCESSING VIDEOS BASED ON TEMPORAL STAGES

(71) Applicant: Intel Corporation, Santa Clara, CA (US)

(72) Inventors: Sovan Biswas, Bonn (DE); Anthony Daniel Rhodes, Portland, OR (US); Ramesh Radhakrishna Manuvinakurike, Hillsboro, OR (US); Giuseppe Raffa, Portland, OR (US); Richard Beckwith, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 18/050,757

(22) Filed: Oct. 28, 2022

(65) Prior Publication Data

US 2023/0124495 A1 Apr. 20, 2023

(51) Int. Cl.
*G06V 20/40* (2022.01)
*G06V 10/764* (2022.01)
*G06V 10/82* (2022.01)

(52) U.S. Cl.
CPC ............ *G06V 20/41* (2022.01); *G06V 10/764* (2022.01); *G06V 10/82* (2022.01); *G06V 20/49* (2022.01)

(58) Field of Classification Search
CPC ...... G06V 20/41; G06V 10/764; G06V 10/82; G06V 20/49; G06V 40/20; G06V 20/44
See application file for complete search history.

(56) References Cited

U.S. PATENT DOCUMENTS

| | | | | |
|---|---|---|---|---|
| 10,296,640 | B1 | 5/2019 | Liao et al. | |
| 2017/0185846 | A1* | 6/2017 | Hwangbo | G06N 3/045 |
| 2020/0167715 | A1* | 5/2020 | Bhatt | G06N 20/00 |
| 2020/0372116 | A1* | 11/2020 | Gao | G06F 16/735 |
| 2022/0156514 | A1 | 5/2022 | Gavrilyuk et al. | |
| 2024/0037948 | A1* | 2/2024 | Chen | G06V 20/46 |

(Continued)

OTHER PUBLICATIONS

Richard et al., "Weakly Supervised Action Learning with RNN Based Fine-to-Coarse Modeling," 2017 IEEE Conference on Computer Vision and Pattern Recognition (CVPR), Honolulu, HI, USA, 2017, pp. 1273-1282, doi: 10.1109/CVPR.2017.140. (Year: 2017).*

(Continued)

*Primary Examiner* — Ming Y Hon
*Assistant Examiner* — Julia Z. Yao
(74) *Attorney, Agent, or Firm* — Akona IP PC

(57) ABSTRACT

Disclosed is a technical solution to process a video that captures actions to be performed for completing a task based on a chronological sequence of stages within the task. An example system may identify an action sequence from an instruction for the task. The system inputs the action sequence into a trained model (e.g., a recurrent neural network), which outputs the chronological sequence of stages. The RNN may be trained through self-supervised learning. The system may input the video and the chronological sequence of stages into another trained model, e.g., a temporal convolutional network. The other trained model may include hidden layers arranged before an attention layer. The hidden layers may extract features from the video and feed the features into the attention layer. The attention layer may determine attention weights of the features based on the chronological sequence of stages.

25 Claims, 12 Drawing Sheets

(56) References Cited

U.S. PATENT DOCUMENTS

| | | | | |
|---|---|---|---|---|
| 2024/0135708 | A1* | 4/2024 | Hussein | G06V 10/82 |
| 2024/0161464 | A1* | 5/2024 | Martin-Martin | G06F 40/30 |
| 2024/0345566 | A1* | 10/2024 | Akella | G06F 30/20 |
| 2025/0131718 | A1* | 4/2025 | Ma | G06V 20/44 |
| 2025/0181986 | A1* | 6/2025 | Suzuki | G06V 40/23 |

OTHER PUBLICATIONS

Han et al., "Temporal Alignment Networks for Long-term Video," 2022 IEEE/CVF Conference on Computer Vision and Pattern Recognition (CVPR), New Orleans, LA, USA, Sep. 2022, pp. 2896-2906, doi: 10.1109/CVPR52688.2022.00292. (Year: 2022).*

Li et al., "Action Shuffle Alternating Learning for Unsupervised Action Segmentation," 2021 IEEE/CVF Conference on Computer Vision and Pattern Recognition (CVPR), Nashville, TN, USA, 2021, p. 12623-12631, doi: 10.1109/CVPR46437.2021.01244. (Year: 2021).*

Luo et al., "Action Unit Memory Network for Weakly Supervised Temporal Action Localization," 2021 IEEE/CVF Conference on Computer Vision and Pattern Recognition (CVPR), Nashville, TN, USA, 2021, pp. 9964-9974, doi: 10.1109/CVPR46437.2021.00984. (Year: 2021).*

Lu et al., "Set-Supervised Action Learning in Procedural Task Videos via Pairwise Order Consistency," 2022 IEEE/CVF Conference on Computer Vision and Pattern Recognition (CVPR), New Orleans, La, USA, 2022, p. 19871-19881, doi: 10.1109/CVPR52688.2022.01928. (Year: 2022).*

Alayrac et al., "Unsupervised Learning from Narrated Instruction Videos," arXiv, in Computing Research Repository (CoRR), 2016, vol. abs/1506.09215 [online]. [retrieved on Jun. 28, 2016]. Retrieved from the Internet <URL: http://arxiv.org/abs/1506.09215> (Year: 2016).*

Richard et al., "Temporal Segmentation of Human Actions in Videos," 2019, Universitat Bonn, Dissertation for Doctor rerum naturalium. (Year: 2019).*

Li et al., "Action Segmentation with Limited Supervision," 2021, Oregon State University, Dissertation for Degree of Doctor of Philosophy. <URL: https://ir.library.oregonstate.edu/concern/graduate_thesis_or_dissertations/p2677277n> (Year: 2021).*

Zhukov et al., "Learning to localize goal—oriented actions with weak supervision," 2022, Computer Vision and Pattern Recognition [cs.CV]. PSL University. Thesis for Doctorate in Sciences and Mathematics. <URL: https://inria.hal.science/tel-03518272/> (Year: 2022).*

Malmaud et al., "What's Cookin'? Interpreting Cooking Videos using Text, Speech and Vision," arXiv, in Computation and Language , 2015, vol. abs/1503.01558 [online]. [retrieved on Mar. 18, 2015]. Retrieved from the Internet <URL: https://arxiv.org/abs/1503.01558> (Year: 2015).*

Richard et al., "NeuralNetwork-Viterbi: A Framework for Weakly Supervised Video Learning," 2018 IEEE/CVF Conference on Computer Vision and Pattern Recognition, Salt Lake City, UT, USA, 2018, pp. 7386-7395, doi: 10.1109/CVPR.2018.00771. (Year: 2018).*

Wang et al., "Weakly Supervised Temporal Adjacent Network for Language Grounding," in IEEE Transactions on Multimedia, vol. 24, pp. 3276-3286, 2022, doi: 10.1109/TMM.2021.3096087 (Year: 2022).*

Gao et al., "WSLLN: Weakly Supervised Natural Language Localization Networks," Proceedings of the 2019 Conference on Empirical Methods in Natural Language Processing and the 9th International Joint Conference on Natural Language Processing, pp. 1481-1487. (Year: 2019).*

Bojanowski et al. (2014). Weakly Supervised Action Labeling in Videos under Ordering Constraints. In: Computer Vision—ECCV 2014. ECCV 2014. Lecture Notes in Computer Science, vol. 8693. Springer, Cham. https://doi.org/10.1007/978-3-319-10602-1_41 (Year: 2014).*

Ahn, Hyemin et al."Refining Action Segmentation with Hierarchical Video Representations", IEEE/CVF International Conference on Computer Vision (ICCV), 2021, pp. 16282-16290.

Carreira, Joao et al "Quo Vadis, Action Recognition? A New Model and the Kinetics Dataset", 10 pages, arXiv: 1705.07750v3 retrieved from https://doi.org/10.48550/arXiv.1705.07750 on Oct. 26, 2022.

Kuehne, Hilde et al."The Language of Actions : Recovering the Syntax and Semantics of Goal-Directed Human Activities", 8 pages, 2014 IEEE Conference on Computer Vision and Pattern Recognition, 2014.

Lea, Colin "Temporal Convolutional Networks for Action Segmentation and Detection", In Proceedings—30th IEEE Conference on Computer Vision and Pattern Recognition, CVPR 2017 (pp. 156-165).

Li, Shijie et al "MS-TCN++: Multi-Stage Temporal Convolutional Network for Action Segmentation", 13 pages, arXiv: 2006.09220v2 [cs.CV], retrieved from https://doi.org/10.48550/arXiv.2006.09220 on Oct. 26, 2022.

Lu, Zijia et al "Weakly-Supervised Action Segmentation and Alignment via Transcript-Aware-Union-of-Subspaces Learning", 2021 IEEE/CVF International Conference on Computer Vision (ICCV), 2021, pp. 8065-8075.

Souri, Yaser et al "Fast Weakly Supervised Action Segmentation Using Mutual Consistency", 13 pages, arXiv:2108.03894v1 [cs.CV], retrieved from https://doi.org/10.48550/arXiv.2108.03894 on Oct. 26, 2022.

Yi, Fangqui et al "ASFormer: Transformer for Action Segmentation", 19 pages, arXiv:2110.08568v1 [cs.CV], retrieved from https://doi.org/10.48550 on Oct. 26, 2022.

* cited by examiner

PROCESSING VIDEOS BASED ON TEMPORAL STAGES

TECHNICAL FIELD

This disclosure relates generally to video processing, and more specifically, processing videos based on temporal stages, e.g., with deep neural networks.

BACKGROUND

Deep neural networks (DNNs) are used extensively for a variety of artificial intelligence applications that include image classification and video segmentation. Video segmentation is a process of partitioning a video into disjoint sets of consecutive frames that are homogeneous according to some defined criteria, such as actions, scenes, shots, camera-takes, and so on. Video segmentation is important in various applications such as video indexing, video surveillance, autonomous driving, robotics, and so on.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
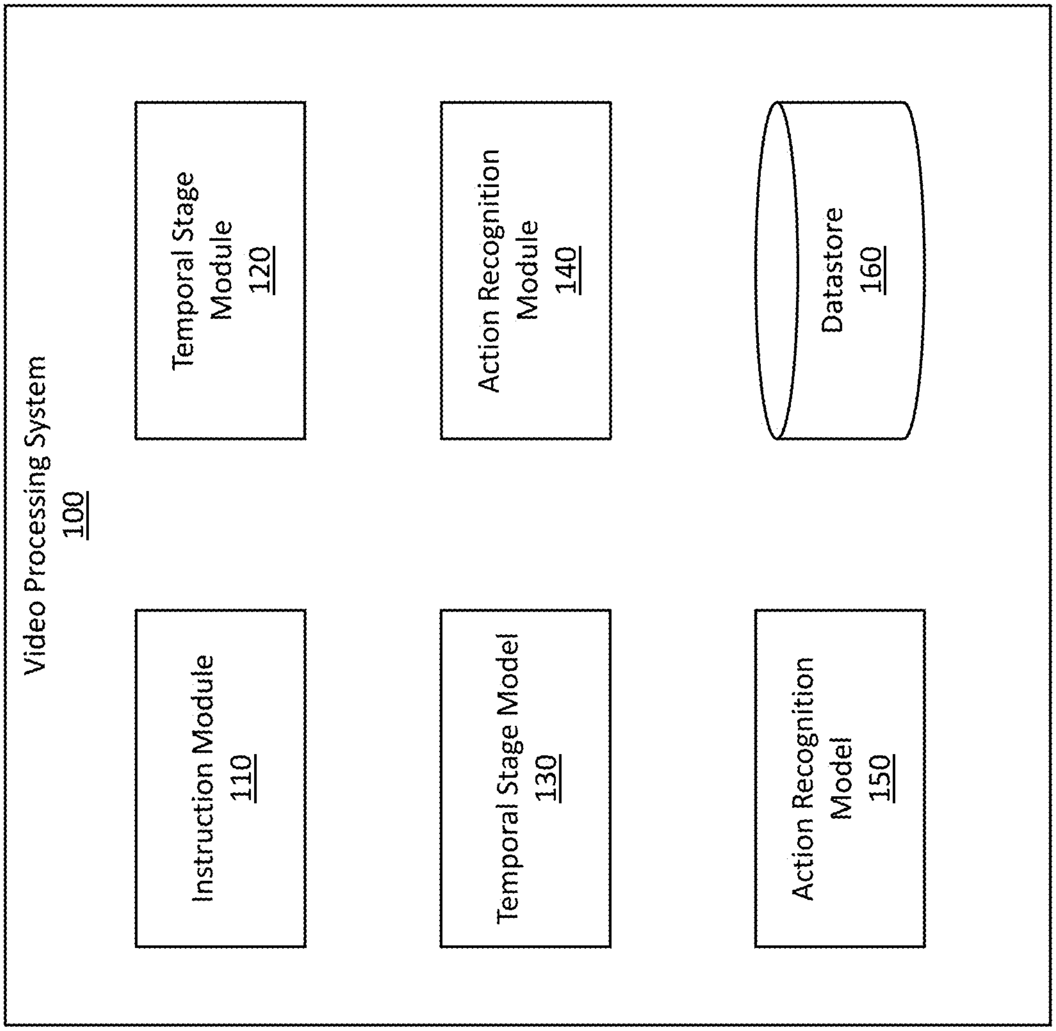
FIG. 1 is a block diagram of a video processing system, in accordance with various embodiments.

The last decade has witnessed a rapid rise in AI (artificial intelligence) based data processing, particularly based on DNN. DNNs are widely used in the domains of computer vision, speech recognition, image, and video processing mainly due to their ability to achieve beyond human-level accuracy. For instance, DNNs are used in human assistive systems. Human assistive systems, when deployed, provide constructive feedback to aid a human in their routine tasks, such as cooking, manufacturing process, or any other tasks that have a structured approach based on a recipe or manual. These systems utilize action recognition approaches to recognize actions performed by human in real-time and subsequently provide feedback (such as suggesting the next step of the task or detecting any potential errors in the current phase, etc.) based on instructions of the tasks, e.g., recipe, manual, specification, handbook, guideline, and so on.

Thus, action recognition is a critical component of human assistive systems. The goal of action recognition in human assistive systems is to recognize various action segments that culminate in the completion of tasks. However, identifying and locating the action segments is a significant challenge due to variations of actions performed by different people. For instance, there can be variations in the order of actions, in the types of actions, in the duration of actions, and so on. For example, people may cook a meal irrespective of the recipe. As another example, people may use a machine without following the manual.

Current solutions for temporal action recognition, segmentation, or detection usually use temporal convolution or transformer-based models. Some solutions use task instructions to tackle any ambiguities in action recognition or detection. Many solutions also incorporate task features to append to frame-wise local information. Appending task features can provide relevant context to detect and recognize action segments within videos, especially for offline processing where the complete video capturing the task is accessible beforehand. However, the current solutions have a significant drawback for online action recognition and detection due to the lack of future foresight. Therefore, improved technology for action recognition is needed.

Embodiments of the disclosure provide a video processing system that recognize actions performed for completing tasks and illustrated in videos based on chronological stage sequences of the tasks. A chronological stage sequence of a task is a chronological sequence of stages within the task. The completion of the stages in accordance with the chronological order may be necessary for completing the task, despite variations in actions by different people or machine (e.g., robots) for completing the task. The chronological stage sequence may be generated by a first trained model and can be fed into a second trained model that processes a video capturing actions performed for completing the task. The second trained model may recognize the actions, partition the video into segments, predict to-be-performed actions, provide recommendation, or output other determinations based on the chronological stage sequence.

An example video processing system may process an instruction for a task and identify a sequence of actions from the instruction. The task may be a household task (e.g., making coffee, cooking meal, cleaning, etc.), manufacturing task (e.g., assembly a device, disassemble a device, mixing materials, etc.), construction task (e.g., building construction, road construction, etc.), a different type of task, or some combination thereof. The instruction may be a recipe, a manual, a guideline, a handbook, a reference, a training document, a different type of instruction, or some combination thereof. The sequence of actions may be fed into the first trained model, which outputs a chronological stage sequence of the task. The first trained model may be capable of sequential modeling of various types of data, e.g., text data, video, audio, and so on. An example of the first trained model is a DNN, e.g., a recurrent neural network (RNN). The first trained model may be trained through self-supervised learning, in which training samples are input into the first trained models, and internal parameters of the first trained model may be adjusted based on outputs of the first trained models. The training samples may include the sequence of actions identified from the instruction. The training samples may also include one or more positive training samples and one or more negative training samples. A positive training sample may include a sequence of actions that can result in a completion of the task. A negative training sample may include a sequence of actions that can result in a failure of the task.

The video processing system inputs a video that captures a process (or a portion of the process) of completing a task into the second trained model. The video may include one or more frames. The second trained model can extract frame-wise features from the video, e.g., through one or more hidden layers in the second trained model. The features may be input into an attention layer of the second trained model, which may be arranged after the one or more hidden layers. The attention layer also receives the chronological stage sequence of the task that is generated by the first trained model. The attention layer may determine whether an action illustrated in a frame falls into a stage within the task based on the features of the frame and the chronological stage sequence of the task. The determination of the attention layer can be further used, e.g., by the second trained model, to classify the action, segment the video, predict an action, provide feedback (e.g., what action to perform to complete the task), or make a different type of determination. The second trained model may also be a DNN. An example of the second trained model is a temporal convolutional network, e.g., a multi-stage temporal convolutional network.

By using the chronological stage sequence of a task for video processing, the disclosure provides an end-to-end approach that incorporates the instruction of the task, despite that different people or machine may complete the same task in different ways from the instruction. The end-to-end approach can be used for both offline and online action recognition and video segmentation. The first trained model in the disclosure can generate latent task-specific temporal stages that are agnostic to actual variations from the instruction of the given task. The chronological stage sequence indicates the critical temporal dependency of stages within the task, which can provide useful information for the second trained model to understand the current state of the task as well as future states of the task. Compared with the current solutions, the disclosure provides a more effective approach for action recognition and video segmentation for human (or machine) assistive systems.

For purposes of explanation, specific numbers, materials and configurations are set forth in order to provide a thorough understanding of the illustrative implementations. However, it will be apparent to one skilled in the art that the disclosure may be practiced without the specific details or/and that the disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the disclosure, the phrase “A and/or B” means (A), (B), or (A and B). For the purposes of the disclosure, the phrase “A, B, and/or C” means (A), (B), (C), (A and B), (A and C), (B and C), or (A, B, and C). The term “between,” when used with reference to measurement ranges, is inclusive of the ends of the measurement ranges.

The description uses the phrases “in an embodiment” or “in embodiments,” which may each refer to one or more of the same or different embodiments. The terms “comprising,” “including,” “having,” and the like, as used with respect to embodiments of the disclosure, are synonymous. The disclosure may use perspective-based descriptions such as “above,” “below,” “top,” “bottom,” and “side” to explain various features of the drawings, but these terms are simply for ease of discussion, and do not imply a desired or required orientation. The accompanying drawings are not necessarily drawn to scale. Unless otherwise specified, the use of the ordinal adjectives “first,” “second,” and “third,” etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms “substantially,” “close,” “approximately,” “near,” and “about,” generally refer to being within +/−20% of a target value based on the input operand of a particular value as described herein or as known in the art. Similarly, terms indicating orientation of various elements, e.g., “coplanar,” “perpendicular,” “orthogonal,” “parallel,” or any other angle between the elements, generally refer to being within +/−5-20% of a target value based on the input operand of a particular value as described herein or as known in the art.

In addition, the terms “comprise,” “comprising,” “include,” “including,” “have,” “having” or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term “or” refers to an inclusive “or” and not to an exclusive “or.”

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example Video Processing System

FIG. 1 is a block diagram of a video processing system 100, in accordance with various embodiments. The video processing system 100 process videos that capture performance of tasks based on temporal stages of the tasks. Examples of the task may include household task (e.g., making coffee, cooking meal, cleaning, etc.), manufacturing task (e.g., assembly a device, disassemble a device, mixing materials, etc.), construction task (e.g., building construction, road construction, etc.), other types of tasks, or some combination thereof. The video processing system 100 includes an instruction module 110, a temporal stage module 120, a temporal stage model 130, an action recognition module 140, an action recognition model 150, and a datastore 160. In other embodiments, alternative configurations, different or additional components may be included in the video processing system 100. Further, functionality attributed to a component of the video processing system 100 may be accomplished by a different component included in the video processing system 100 or a different system.

The instruction module 110 identifies a plurality of actions from an instruction for completing a task. The instruction may include a recipe, a manual, a guideline, a handbook, a reference, a training document, other types of instruction, or some combination thereof. The instruction may include text, image, video, audio, other types of information, or some combination thereof. The instruction may include information indicating the actions. The performance of each action may be intended for completing the task. The instruction module 110 may process the instruction to extract the actions. The instruction module 110 may also determine an order of the actions based on the instruction. In some embodiments, the instruction module 110 outputs a sequence of actions. In an example where the task is making an omelet, the sequence of actions may include crack eggs, beat eggs, melt butter, add butter into eggs, pour egg mixture into a cooking pan, add filing, fold the omelet, and put the omelet onto a plate.

The instruction module 110 may generate various types of data specifying the identified actions. For instance, the instruction module 110 may output text, audio, video, time-series data, or other types of data. The sequence of actions generated by the instruction module 110 may constitute a standard or reference for completing the task. The task can be successfully completed by a person or machine that performs the actions in the order. The task may also be completed through variations of the standard. A person or machine may perform the actions in a different order but can still complete the task. In the example where the task is making an omelet, an omelet can be made even though the person or machine melts butter before eggs are cracked. As another example, a person or machine may miss one of the actions or perform an action not identified by the instruction module 110 but can still complete the task. Taking the task of making an omelet for example again, an omelet can be made even though a person or machine does not crack eggs but chooses to use boxed liquid egg instead. Also, an omelet can be made even though a person or machine does not melt butter or add butter into eggs but chooses to add vegetable oil into eggs instead.

Not all variations from the standard can lead to completion of the task. In some embodiments, one or more of the actions are necessary for completing the task. For example, a person or machine cannot make an omelet without adding filling. The temporal order of some actions may be unchangeable. For instance, a person or machine cannot fold omelet before pouring egg mixture into a cooking pan. The task may have a sequence of stages, the chronological completion of which is necessary to complete the task.

The temporal stage module 120 generates a chronological sequence of stages ("chronological stage sequence" or "temporal stage sequence") for a task based on actions identified by the instruction module 110. The chronological sequence of stages includes a plurality of stages for completing the task. A stage may be a vector that indicates a state of the task. The stages are arranged in accordance with a chronological order. The occurrence of the stages in the chronological order may be necessary for completing the task. A stage is also referred to as a temporal stage, as the position of the stage in the chronological sequence corresponds to a time when the stage occurs in relative to the other stages. The occurrence of a stage that is precedent to one or more other stages in the chronological sequence may be a prerequisite for occurrence of the one or more other stages. In the example task of making an omelet, the task may include a first stage of preparation, a second stage of cooking, a third stage of finishing. The first stage is a prerequisite for the other two stages, as cooking or finishing cannot be done without preparation. The second stage is a prerequisite for the third stage. In other examples, a task may include a different number of stages.

Different actions identified by the instruction module 110 from the instruction for a task may fall into different stages of the task. A stage may include one or more actions. One or more of the stages may be latent and not specifically described in the instruction. A stage of the task may be different from the one or more actions that fall into the stage. For instance, cracking eggs, beating eggs, melting butter, and adding butter into eggs may fall into the preparation stage of the task of making an omelet. Pouring egg mixture into a cooking pan and adding fills may fall into the cooking stage. Folding the omelet and putting the omelet on a plate may fall into the finishing stage. Also, different tasks may have different chronological stage sequences. For instance, the chronological stage sequence for the task of making an omelet is different from a chronological stage sequence for the task of making a coffee and different from a chronological stage sequence for the task of assembling a car. The temporal stage module 120 may use the temporal stage model 130, which is a model trained through machine learning techniques, to determine the chronological stage sequence.

In some embodiments, the temporal stage module 120 inputs the sequence of actions generated by the instruction module 110 into the temporal stage model 130. The temporal stage model 130 outputs the chronological stage sequence. The temporal stage model 130 is a model that has been trained through machine learning techniques. In some embodiments, the temporal stage model 130 may be a RNN that can process sequential data, e.g., a sequence of actions identified by the instruction module 110. The sequence of actions can be an input of the RNN, and the RNN outputs a chronological stage sequence. The temporal stage model 130 may determine a length of the chronological sequence, which may equal the number of stages in the chronological sequence. The temporal stage model 130 may determine the length of the chronological sequence empirically.

Figure 11:
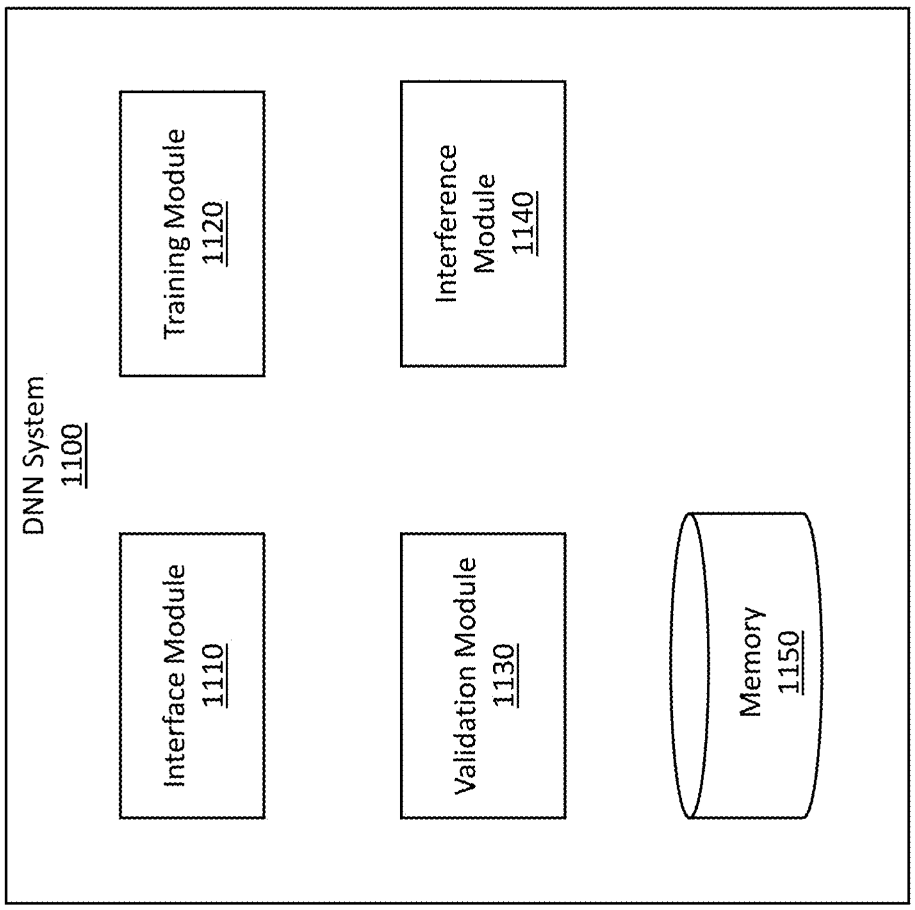
FIG. 11 is a block diagram of an example DNN system, in accordance with various embodiments.

The temporal stage module 120 may train the temporal stage model 130 or receive the temporal stage model 130 from another system that trains the temporal stage model 130, e.g., the DNN system 1100 in FIG. 11. In some embodiments, the temporal stage model 130 is trained through self-supervision. A training dataset including a plurality of training samples may be generated. A training sample includes a sequence of actions, the performance of which is for the purpose of completing the task. The training samples are input into the temporal stage model 130. The values of internal parameters of the temporal stage model 130 are adjusted based on the training samples.

The training dataset may include a positive training dataset and a negative training dataset. In some embodiments, a training sample in the positive training dataset ("positive training sample") includes a sequence of actions that has been verified that if the actions are performed, the task can be completed. In an example, a t positive training sample may include the sequence of actions identified by the instruction module 110 from the instruction. In another example, a positive training sample may include a sequence of actions that has been performed (e.g., by a person or machine) and the task has been completed. The positive training sample may be generated from a video or audio that captures the performance of the actions or from a document that describes the actions. In some embodiments, a training sample in the negative training dataset ("negative training sample") includes a sequence of actions that has been verified that if the actions are performed, the task cannot be completed. In an example, a negative training sample may include a sequence of actions that has been performed (e.g., by a person or machine) but the task was failed. In another example, a negative training sample in the negative training dataset may be generated through a random permutation of the instruction. More details regarding training the temporal stage model 130 are described below in conjunction with FIG. 3.

The action recognition module 140 processes videos and classifies actions captured by the videos based on temporal stages generated by the temporal stage module 120. A video includes a sequence of frames. In some embodiments, the action recognition module 140 receives a video that captures one or more actions performed for completing a task. The video may capture all actions that have been performed till the completion of the task. Alternatively, the video may capture a subset of the actions. The rest of the actions may not be captured by the video and are to be performed at a later time, e.g., at a time after the video is generated or after the action recognition module 140 processes the video. The action recognition module 140 may process the video offline or online. In some embodiments, the action recognition module 140 can process a video during the streaming of the video.

The action recognition module 140 may classify one or more actions illustrated in the video. For instance, the action recognition module 140 may generate a label describing an action illustrated in the video. The label may be text, audio, etc. In the example task of making an omelet, an example label may be beat eggs. The action recognition module 140 may also partition the video into segments. A segment may include a plurality of consecutive frames that are in the same category. The category may be an action, a scene, a camera-take, a shot, etc. For instance, the action recognition module 140 partitions the video into disjoint sets of consecutive frames that are homogeneous according to some defined criteria, such as actions, scenes, shots, camera-takes, and so on. The action recognition module 140 may also predict an action to be perform towards completing the task based on the processing of the video. For instance, after determining that an action in the video is cracking eggs, the action recognition module 140 may predict that the next action is beating eggs. In some embodiments, the action recognition module 140 provide a recommendation for what action is needed for completing the task. For instance, after determining that an action in the video is adding fills, the action recognition module 140 may provide a recommendation for folding the omelet.

The action recognition module 140 processes a video capturing one or more actions for completing a task based on a chronological stage sequence of the task. As the occurrence of the stages in the chronological sequence may be necessary for completing the task despite to the variations to the instruction of the task, the chronological stage sequence can provide important information for classifying actions, video segmentation, or action prediction. In some embodiments, the action recognition module 140 may determine which stage an action illustrated in the video falls into, e.g., based on a time stamp of a frame that captures the action. For instance, the action recognition module 140 may determine that an action having an early time stamp may fall into the first stage of the task, versus an action having a late time stamp may fall into the last stage of the task. The action recognition module 140 may further determine a classification of the action based on the stage. For instance, the action recognition module 140 may determine the label of an action based on a determination that the action falls into the preparation stage, and the action recognition module 140 may determine that the action is unlikely to be any action in other stages, e.g., it is unlikely that the action is folding the omelet or putting the omelet on a plate.

In the embodiments of FIG. 1, the action recognition module 140 uses the action recognition model 150 to process videos. The action recognition module 140 inputs a video into the action recognition model 150, and the action recognition model 150 may output action classification, video segmentation, prediction, recommendation, or some combination thereof. The action recognition model 150 is a DNN, an example of which is the DNN 900 in FIG. 9. In some embodiments, the action recognition model 150 may be a convolutional neural network. The action recognition model 150 may be a temporal convolutional neural network, e.g., a multi-stage temporal convolutional network. The action recognition module 140 may train the action recognition model 150 or receive the action recognition model 150 from another system, e.g., the DNN system 1100 in FIG. 11.

In some embodiments, the action recognition model 150 includes a sequence of layers. The action recognition module 140 may input the video into a layer (e.g., the first layer in the sequence) of the action recognition model 150. Features may be extracted from the video by at least the layer. In some embodiments, the features may be extracted from the video by the layer and one or more other layers. These layers may be temporal convolutional layers. The features may be convolutional features. In some embodiments, feature extraction is performed on a frame level. The features are frame-wise features. For instance, the layer(s) may extract a set of features from each frame that is input into the action recognition model 150.

The features extracted from the video are input into another layer of the action recognition model 150. This other layer may be an attention layer. The attention layer may also receive the chronological stage sequence of the task.

In some embodiments, the attention layer of the action recognition model 150 may determine a current state of an action based on the chronological stage sequence of the task. In an example, the attention layer may determine a plurality of weights for the features extracted from a frame. Each weight corresponds to a different stage in the chronological sequence. Different weights may have different values. The value of a weight may indicate the likelihood of the action captured by the frame falling into the corresponding stage. The weights may be determined by using a softmax function. In some embodiments, a cross-entropy loss function is used in the attention layer to control the temporal order as actions are correlated to the chronological stage sequence within the task. The attention layer may determine that the stage having the highest weight is the stage of the action. Certain aspects regarding the attention layer are provided below in conjunction with FIGS. 5-7.

The output of the attention layer may be used, e.g., by another layer in the action recognition model 150, to classify actions illustrated in the frames, segment the video, make one or more predictions, provide recommendation, or some combination thereof. In embodiments where the action recognition model 150 is a multi-stage temporal convolutional network, the output of the first stage of the network may be fed into the next stage of the network to be refined by the next stage of the network.

The datastore 160 stores data received, used, or generated by the video processing system 100. For instance, the datastore 160 may store instructions of tasks, actions identified by the instruction module 110, training dataset for training the temporal stage model 130 or the action recognition model 150, stages of tasks generated by the temporal stage module, determinations made by the action recognition module 140, and so on. In some embodiments, the datastore 160 may be associated with an external system. Data in the datastore 160 may be received from the external system. Additionally or alternatively, data in the datastore 160 may be provided to the external system.

Example Temporal Stage Model

Figure 2:
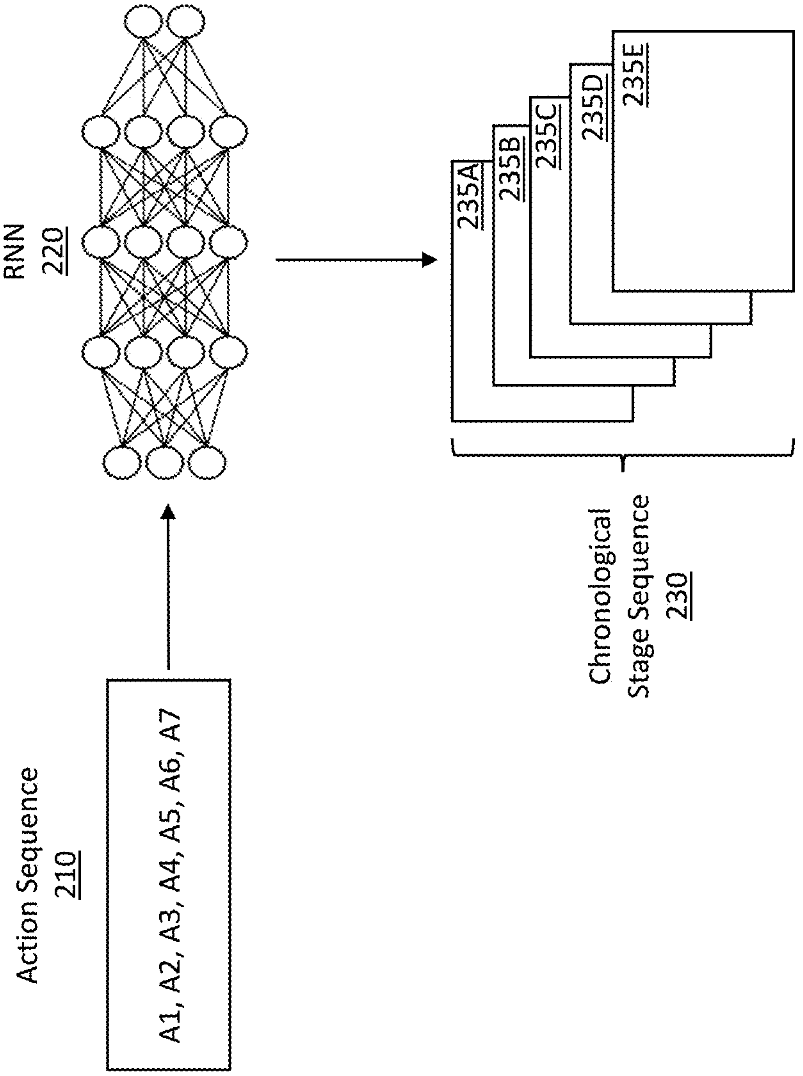
FIG. 2 illustrates generation of a chronological stage sequence of a task, in accordance with various embodiments.

FIG. 2 illustrates generation of a chronological stage sequence 230 of a task, in accordance with various embodiments. For purpose of illustration, the chronological stage sequence 230 includes five stages 235A-235E (collectively referred to as "stages 235" or "stage 235"). In other embodiments, the chronological stage sequence 230 may include a different number of stages 235. The generation of the chronological stage sequence 230 may be performed by the temporal stage module 120 in FIG. 1.

As shown in FIG. 2, an action sequence 210 are input into a RNN 220, and the RNN outputs the chronological stage sequence 230. The action sequence 210 may be generated by the instruction module 110 in FIG. 1. The action sequence 210 includes seven actions A1-A7, which may be identified from an instruction for performing the task. Each action may be performed towards completing the task. The task may be completed through variations of the action sequence 210. In an embodiment, the task can be completed even though the actions are performed in a different order. For instance, the action A4 may be performed before the action A3, but the task can still be completed. Also, an action may be missed or replaced with a different action, but the task can still be completed. Not all variations of the action sequence 210 can achieve completion of the task. Certain variations may fail to complete the task. For instance, the action A4 may have to be performed before the action A3, changing the order of the two actions may cause a failed task. Also, an action may be necessary for the completion of the task, missing the action or replacing the action with a different action can cause a failed task.

The RNN 220 may be an embodiment of the temporal stage model 130. The RNN 220 may perform sequential modeling on the action sequence 210 to generate the chronological stage sequence 230. The RNN 220 may process various types of data, such as text, video, audio, and so on. The RNN 220 may include a plurality of layers. Internal parameters of the RNN 220, e.g., weights, may be determined through training the RNN 220. In some embodiments, the RNN 220 is trained by the temporal stage module 120 in FIG. 1, the training module 1120 in FIG. 11, or another module. The RNN 220 may be trained through a self-supervised approached, e.g., the approach illustrated in FIG. 3.

The chronological stage sequence 230 includes the stages 235 within the task, which are arranged based on a temporal order. In some embodiments, chronological occurrence of the stages 235 in accordance with the temporal order is necessary for completion of the task. The chronological stage sequence 230 applies to the action sequence 210 and all variation of the action sequence 210 that can achieve completion of the task. A variation of the action sequence 210 that does not meet the chronological stage sequence 230 can lead to a failure of the task. Each action in the action sequence 210 may fall under one of the stages 235. In some embodiments, a stage may correspond to one or more actions in the action sequence 210. A stage may be different from the action(s) in the stage. In some embodiments, a stage is latent and not specified in the instruction of the task. The chronological stage sequence 230 may be fed into another trained model for processing a video that captures a processing of performing the task or a portion of the task.

Figure 3:
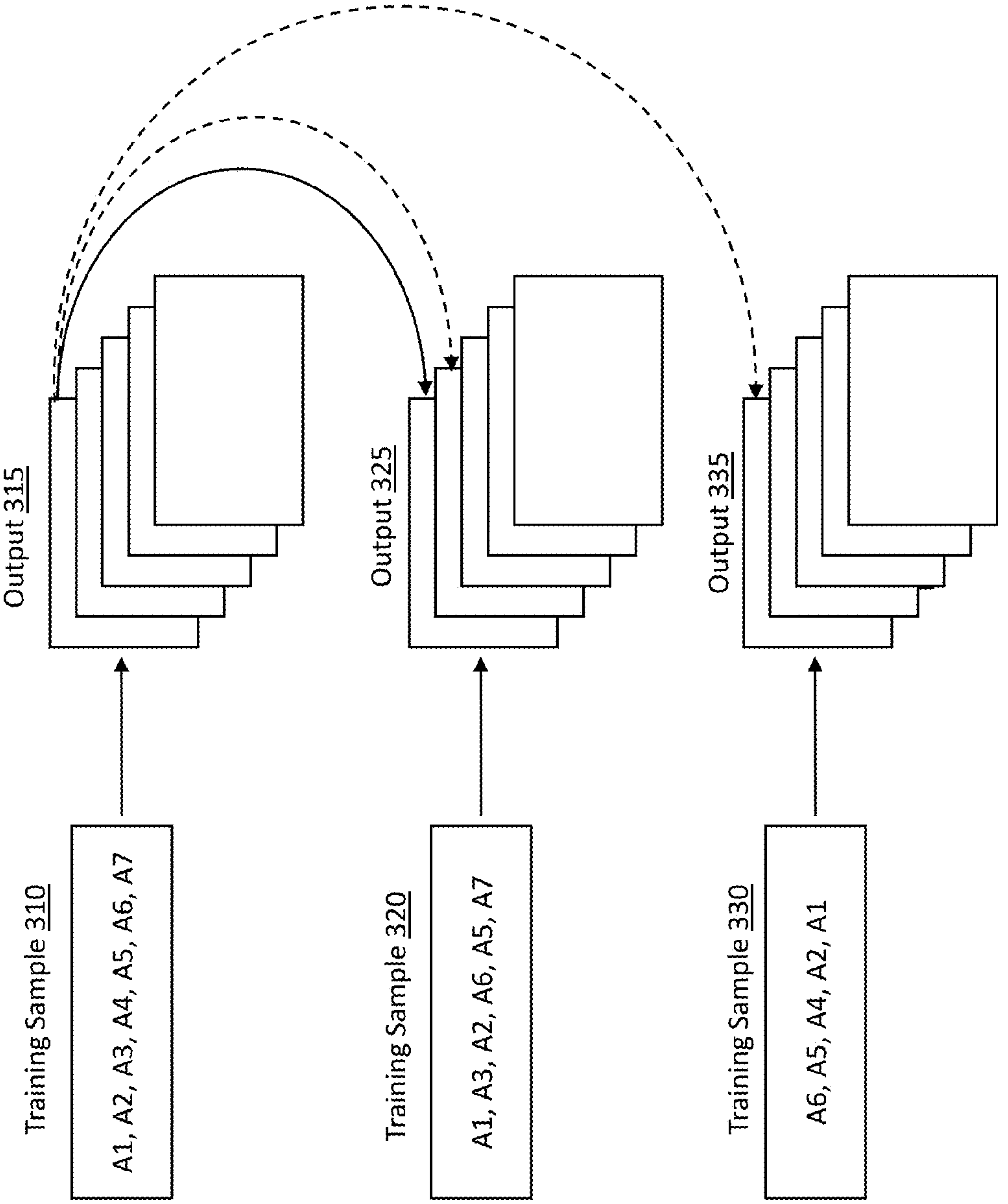
FIG. 3 illustrates a process of training a temporal stage model through self-supervised learning, in accordance with various embodiments

FIG. 3 illustrates a process of training a temporal stage model through self-supervised learning, in accordance with various embodiments. The temporal stage model may be an embodiment of the temporal stage model 130 in FIG. 1. An example of the temporal stage model may be the RNN 220 in FIG. 2. The temporal stage model is trained by a training dataset including training samples 310, 320, and 330. For purpose of illustration, FIG. 3 shows three training samples 310, 320, and 330. In other embodiments, the training dataset may include more training samples, such as dozens, hundreds, thousands, or even more.

In the embodiments of FIG. 3, the training sample 310 is a standard training sample and includes an action sequence generated from an instruction for completing the task. An example of the action sequence may be the action sequence 210 in FIG. 2. The action sequence may also be referred to as a standard action sequence or a reference action sequence. The training sample 320 is a positive training sample and includes an action sequence that is different from the action sequence in the training sample 310. The action sequence in the training sample 320 may be referred to as a positive variation. It may have been verified that the completion of the action sequence in the training sample 320 can lead to the completion of the task. The positive variation may be generated based on a video, audio, or document that captures a process in which the task was completed.

The training sample 330 is a negative training sample and includes an action sequence that is different from the action sequence in the training sample 310 and from the action sequence in the training sample 320. The action sequence in the training sample 330 may be referred to as a negative variation. It may have been verified that the completion of the action sequence in the training sample 330 cannot lead to the completion of the task. The task would be failed by performing the action sequence in the training sample 330. An example of the negative variation may be a random permutation of the standard action sequence. An example of the negative variation may be generated based on a video, audio, or document that captures a process in which the task was failed. Yet another example of the negative variation may be generated based on a video, audio, or document that captures a process of performing a different task. Even though FIG. 3 shows one standard training sample, one positive training sample, and one negative training sample, the training dataset for training the temporal stage module may include more than one standard training sample, more than one positive training sample, or more than one negative training sample.

In the self-supervised learning, the training samples 310, 320, and 330 are input into the temporal stage model. The temporal stage model generates outputs 315, 325, and 335, respectively. Each of the outputs 315, 325, and 335 is a chronological stage sequence. The stages or the orders of the stages in the outputs 315, 325, and 335 may be different. The internal parameters of the temporal stage model are adjusted based on the similarities and dissimilarities between the outputs 315, 325, and 335. In some embodiments, an objective of the self-supervised learning is to increase the similarity of stages indicated by the solid line arrow so that a stage at the same temporal location of the task for different training samples should be similar. The self-supervised learning may also include reducing similarity of stages indicated by the dash line arrows. The stages at the same location of two different tasks should be dissimilar. The stages should also be dissimilar if they are at two different temporal locations of the task.

In some embodiments, the self-supervised learning uses a contrastive loss function:

$$L_{ij}^{k} = \frac{e^{z_{ij}^{k}}}{\sum_{J}\sum_{K} e^{z_{ij}^{k}}}$$

where i denotes a standard action sequence, which may be generated from an instruction for completing a task; K denotes the length of a chronological stage sequence of the task; J denotes a set of variations of the standard action sequence i,J contains a positive variation j and J−1 negative variations;

$$L_{ij}^{k}$$

denotes the contrastive loss of the k-th stage of the standard action sequence i with the positive variation j; z denotes the dot product similarity between k-th embedding of the standard action sequence i and the positive variation j.

Example Action Recognition Model

Figure 4:
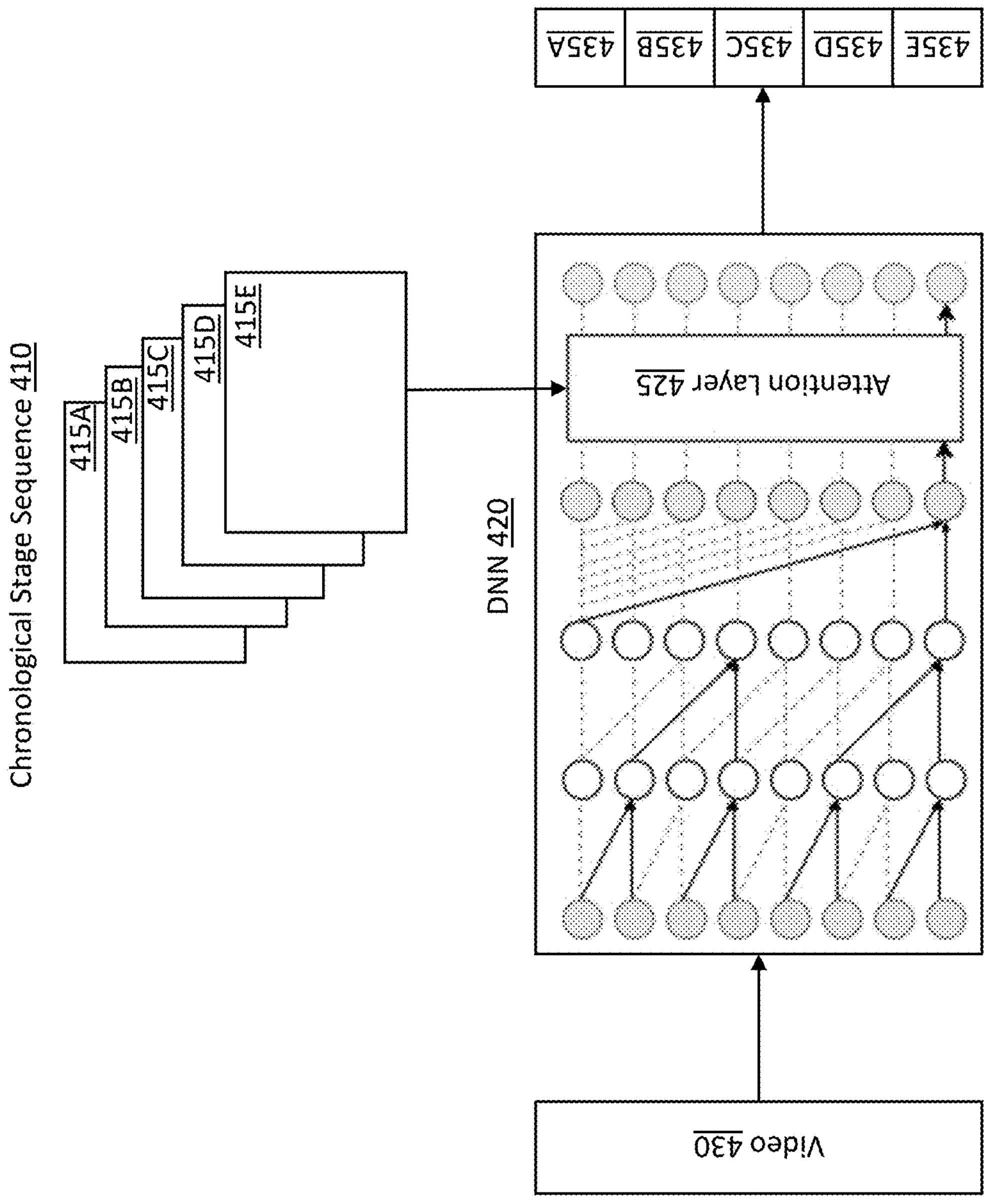
FIG. 4 illustrates video segmentation based on a chronological stage sequence of a task, in accordance with various embodiments.

FIG. 4 illustrates video segmentation based on a chronological stage sequence 410 of a task, in accordance with various embodiments. The chronological stage sequence 410 includes stages 415A-415E (collectively referred to as “stages 415” or “stage 415”) arranged in a temporal order. An example of a stage 415 may be a stage 235 in FIG. 2. The chronological stage sequence 410 may be generated by the temporal stage module 120 in FIG. 1. The stage 415A is the first stage of the task and the stage 415E is the last stage of the task. The chronological stage sequence 410 is fed into a DNN 420. The DNN 420 is an action recognition model and may be an embodiment of the action recognition model 150 in FIG. 1. In an example, the DNN 420 is a temporal convolutional network. The DNN 420 also receive a video

430 as an input. The video 430 captures one or more actions performed by a person, machine, or both for completing the same task.

In the embodiment of FIG. 4, the chronological stage sequence 410 is fed into an attention layer 425 of the DNN 420. The DNN 420 includes a plurality of hidden layers before the attention layer 425. The video 430 is fed into the first hidden layer of the DNN 420. The hidden layers before the attention layer 425 may extract feature from frames in the video 430. In some embodiments, a hidden layer may output a feature map for a single frame. The feature map may be fed into the next hidden layer for further processing. A hidden layer before the attention layer 425 may be a convolutional layer, e.g., a temporal convolutional layer. Alternatively, a hidden layer before the attention layer 425 may be a pooling layer. For purpose of illustration, there are eight frames in the video in the embodiments of FIG. 3, and each of the hidden layers outputs eight feature maps, which are represented by circles arranged in a column in FIG. 3. In other embodiments, the video 430 may include a different number of frames, and a hidden layer may generate a different number of feature maps.

The attention layer 425 receives feature maps generated by the last hidden layer before the attention layer 425 and processes the feature maps based on the chronological stage sequence 410. In some embodiments, for each feature map generated from a respective frame in the video 430, the attention layer 425 determines which stage 415 an action captured by the respective frame falls into. The attention layer 425 may determine five attention scores for a feature map, and the five attention scores are for each of the stages 415. The attention score for a stage 415 may indicate a probability of the action falling into the stage 415. An attention score may also be referred to as an attention weight. The attention layer 425 may use a softmax function to determine the attention scores. The attention layer 425 may select the stage 415 having the highest attention score as the stage of the action in the frame.

The output of the attention layer 425 may be fed into the next layer of the DNN 420. The next layer of the DNN 420 may classify the actions in the video based on the stages of the actions. For instance, the DNN 420 may use the stage where an action falls as a guidance to determine a label indicating the classification of the action. In the example where the task is to make an omelet and an action is in the preparation stage, the DNN 420 may select a classification of the action from cracking egg, beating egg, adding butter, or other actions in the preparation stage. The DNN 420 may determine that the action is unlikely any action in other stages of the task, e.g., putting egg into a pan, adding filing, folding cooked egg, putting omelet onto a plate, etc. In some embodiments, the output of the DNN 420 that describes the classification of an action may include information indicating the stage to which the action belongs. The DNN 420 also partitions the video 430 into segments 435A-435E (collectively referred to as “segments 435” or “segment 435”). In some embodiments, a segment 435 may correspond to one or more stages 415. The segment 435 may include the frames that capture the actions falling into the one or more stages 415. The order in which the segments 435 are arranged may follow the temporal order of the stages 415.

Even though not shown in FIG. 4, the DNN 420 may also predict an action that the person or machine will perform towards completing the task based on outputs of the attention layer 425. For instance, the DNN 420 may predict the action based on the classification of the last action illustrated in the video 430. Additionally or alternatively, the DNN 420 may provide a recommendation to the person or machine and specify an action that the person or machine should perform to complete the task. In some embodiments, the DNN 420 may generate the recommendation based on the classification of the last action illustrated in the video 430 or the stage of the last action.

Figure 5:
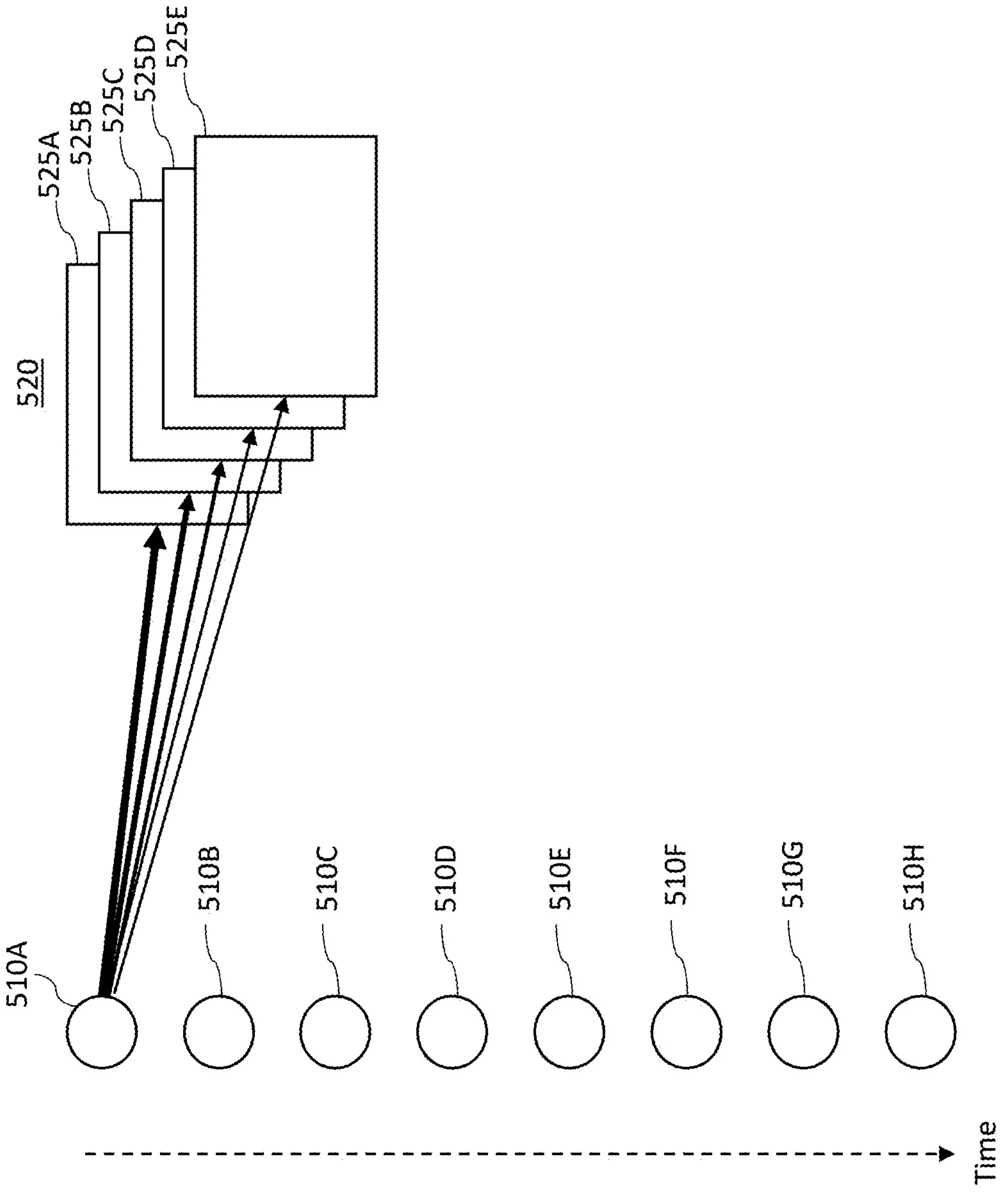
FIG. 5 illustrates attention weights determined for a frame based on a chronological stage sequence, in accordance with various embodiments.

FIG. 5 illustrates attention weights determined for a frame 510A based on a chronological stage sequence 520, in accordance with various embodiments. FIG. 5 shows eight frames 510A-510H (collectively referred to as "frames 510" or "frame 510"). The frames 510 may be from a video capturing actions for completing a task. An example of the video is the video 430 in FIG. 4. Each frame 510 is represented by a circle, which may be a feature map generated from the frame 510, e.g., by one or more hidden layers in a DNN, e.g., the DNN 420. The attention weights may be determined by an attention layer, such as the attention layer 425 in FIG. 4.

As shown in FIG. 5, the frames 510 are arranged in a temporal order. The time stamp of a preceding frame 510 is earlier than the time stamp of a subsequent frame 510. In the embodiments of FIG. 5, the frame 510A has the earliest timestamp, and the frame 510H has the latest timestamp. The attention weights of the frame 510A is determined based on the timestamp of the frame 510 and the chronological stage sequence 520. The chronological stage sequence 520 includes five stages 525A-525B (collectively referred to as "stages 525" or "stage 525") of the task.

The attention weights of the 510A may be determined by determining a likelihood of the action illustrated in the frame 510A falling into each of the stages 525. The likelihood for a stage 525 may be determined based on the timestamp of the frame 510A (or a position of the frame 510A in the video) and a position of the stage in the chronological stage sequence 520. As the frame 510A has the earliest timestamp, it may be determined that the frame 510A mostly likely fall into the stage 525A and least likely fall into the stage 525E. Accordingly, the attention weight for the stage 525A is the highest, the attention weight for the stage 525B is the second highest, the attention weight for the stage 525C is the third highest, the attention weight for the stage 525D is the fourth highest, and the attention weight for the stage 525E is the lowest. The differences in the attention weights are illustrated in FIG. 5 through the widths of the arrows. It may be determined, based on the attention weights, that the action illustrated in the frame 510A falls into the stage 525A.

Figure 6:
FIG. 6 illustrates attention weights determined for another frame based on the chronological stage sequence in FIG. 5, in accordance with various embodiments.

FIG. 6 illustrates attention weights determined for another frame 510D based on the chronological stage sequence 520 in FIG. 5, in accordance with various embodiments. The attention weights of the frame 510D may be determined by determining a likelihood of the action illustrated in the frame 510D falling into each of the stages 525. The likelihood for a stage 525 may be determined based on the timestamp of the frame 510D (or a position of the frame 510D in the video) and a position of the stage in the chronological stage sequence 520. As the frame 510D is in the middle of the video, it may be determined that the frame 510B mostly likely fall into the stage 525C, which is in the middle of the chronological stage sequence 520, but less likely fall into the stage 525A, which is at the beginning of the chronological stage sequence 520, or the stage 525E, which is at the end of the chronological stage sequence 520. Accordingly, the attention weight for the stage 525C is the highest, the attention weight for the stage 525D is the second highest, the attention weight for the stage 525B is the third highest, and the attention weights for the stage 525A and 525E are the lowest. The differences in the attention weights are illustrated in FIG. 6 through the widths of the arrows. It may be determined, based on the attention weights, that the action in the frame 510D falls into the stage 525C.

Figure 7:
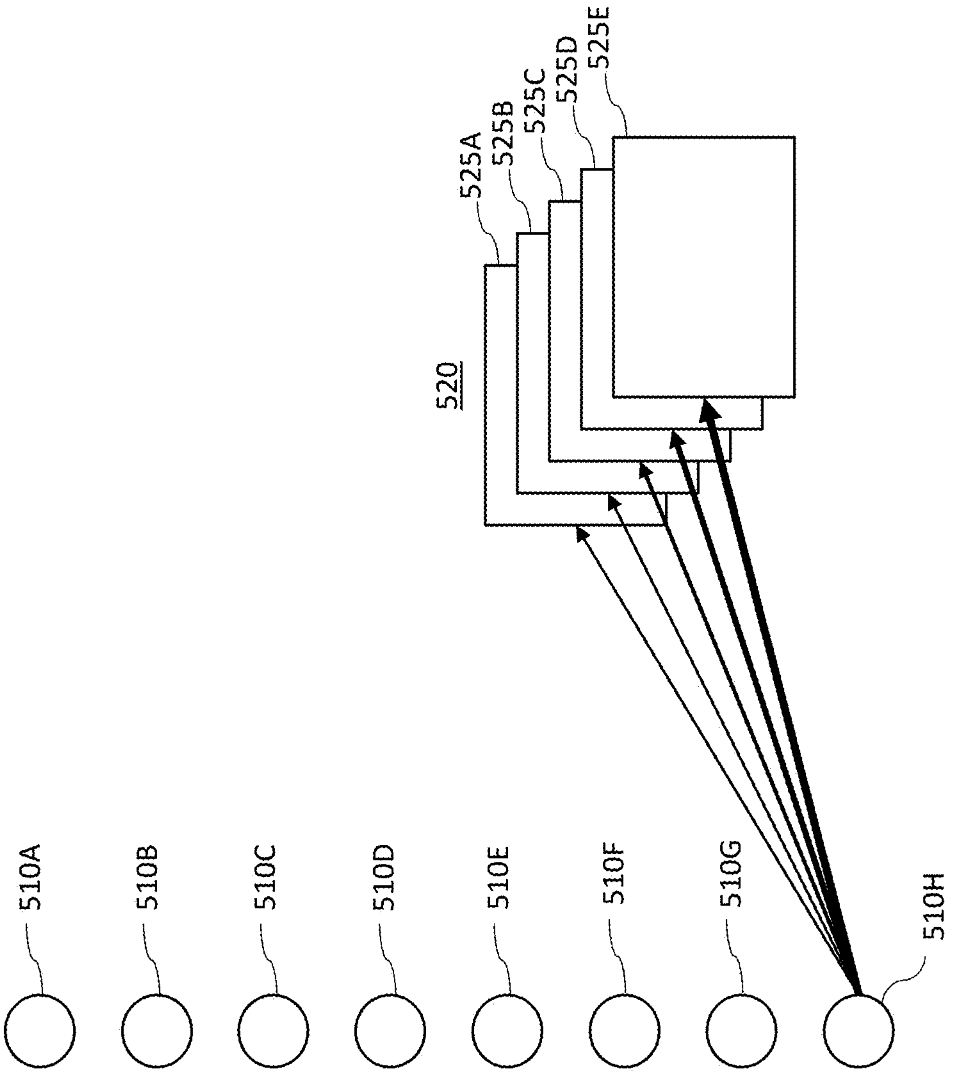
FIG. 7 illustrates attention weights determined for yet another frame based on the chronological stage sequence in FIG. 5, in accordance with various embodiments.

FIG. 7 illustrates attention weights determined for yet another frame 510H based on the chronological stage sequence 520 in FIG. 5, in accordance with various embodiments. The attention weights of the frame 510H may be determined by determining a likelihood of the action illustrated in the frame 510H falling into each of the stages 525. The likelihood for a stage 525 may be determined based on the timestamp of the frame 510H (or a position of the frame 510H in the video) and a position of the stage in the chronological stage sequence 520. As the frame 510H is in the last frame of the video, it may be determined that the frame 510H mostly likely fall into the stage 525C, which is in the middle of the chronological stage sequence 520, but less likely fall into the stage 525E, which is at the end of the chronological stage sequence 520. Accordingly, the attention weight for the stage 525E is the highest, the attention weight for the stage 525D is the second highest, the attention weight for the stage 525C is the third highest, the attention weight for the stage 525D is the fourth highest, and the attention weight for the stage 525A is the lowest. The differences in the attention weights are illustrated in FIG. 7 through the widths of the arrows. It may be determined, based on the attention weights, that the action in the frame 510H falls into the stage 525E.

Example Video Processing Method

Figure 8:
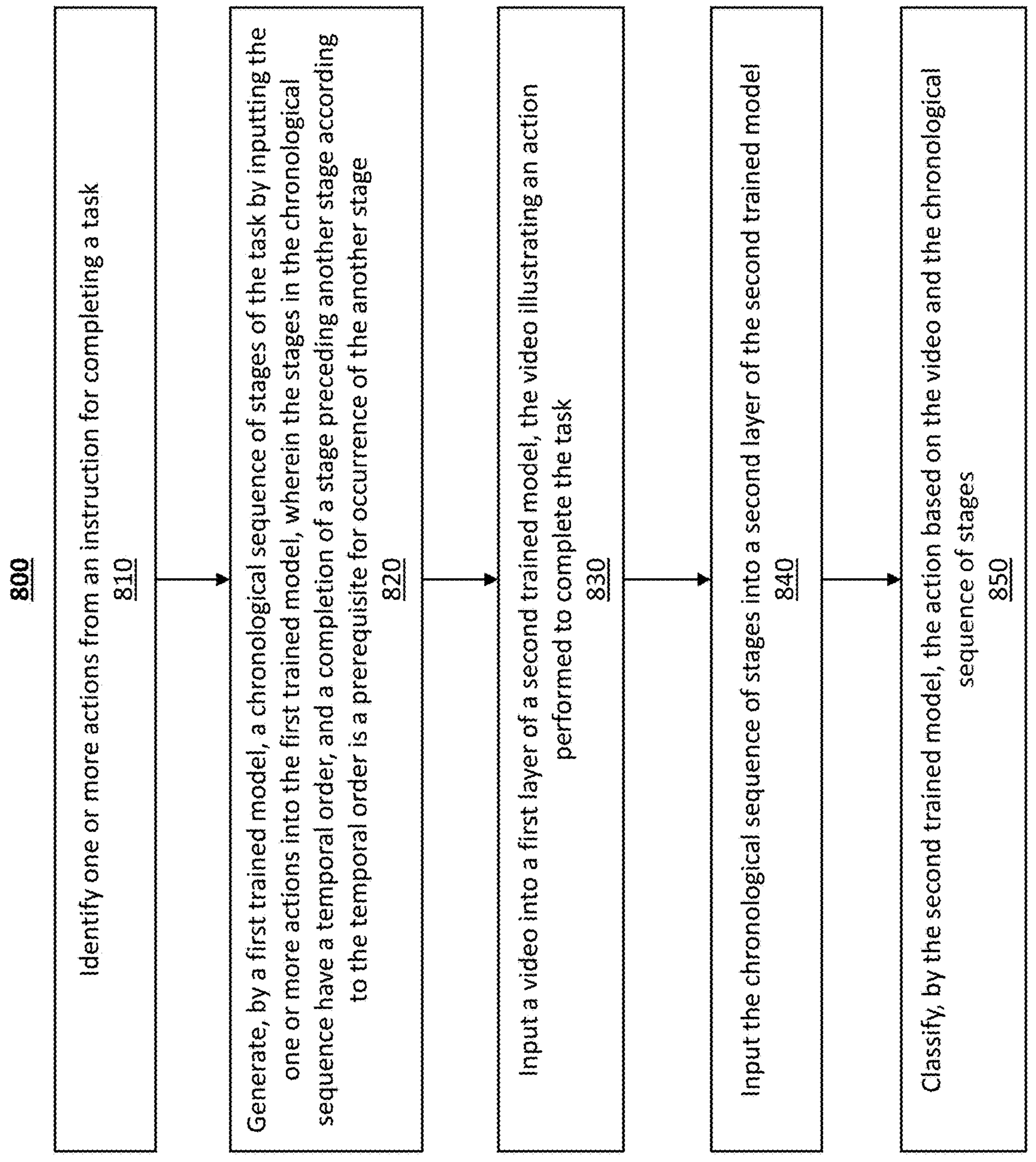
FIG. 8 is a flowchart showing a method of video processing, in accordance with various embodiments.

FIG. 8 is a flowchart showing a method 800 of video processing, in accordance with various embodiments. The method 800 may be performed by the video processing system 100 in FIG. 1. Although the method 800 is described with reference to the flowchart illustrated in FIG. 8, many other methods for video processing may alternatively be used. For example, the order of execution of the steps in FIG. 8 may be changed. As another example, some of the steps may be changed, eliminated, or combined.

The video processing system 100 identifies 810 one or more actions from an instruction for completing a task. The instruction may be a manual, a guideline, a handbook, and so on. The instruction may include text, video, audio, or other types of information. The task may be a household task (e.g., making coffee, cooking meal, cleaning, etc.), manufacturing task (e.g., assembly a car, disassemble a car, mixing materials, etc.), construction task (e.g., building construction, road construction, etc.), other types of tasks, or some combination thereof.

The video processing system 100 generates 820, by a first trained model, a chronological sequence of stages of the task by inputting the one or more actions into the first trained model. The stages in the chronological sequence have a temporal order. A completion of a stage preceding another stage according to the temporal order is a prerequisite for occurrence of the another stage.

The video processing system 100 inputs 830 a video into a first layer of a second trained model. The video illustrates an action performed to complete the task. In some embodiments, the video processing system 100 trains the first trained model by inputting one or more training samples into the first trained model. Each training sample comprises a sequence of actions performed to complete the task. The one or more training samples may comprise a training sample including at least one of the one or more actions. The one or more training samples may comprise one or more positive training samples. Each positive training sample comprises a sequence of actions through which the task was completed. The one or more samples may comprise one or more negative training samples. Each negative training sample comprises a sequence of actions through which the task was not completed.

The video processing system 100 inputs 840 the chronological sequence of stages into a second layer of the second trained model. In some embodiments, the second layer is arranged after the first layer in the second trained model. The second layer receives features extracted from the video by at least the first layer.

The video processing system 100 classifies 850, by the second trained model, the action based on the video and the chronological sequence of stages. In some embodiments, the video processing system 100 determines, in the second layer of the second trained model, attention weights for a frame in the video based on a timestamp associated with the frame. Each attention weight corresponds to a different stage in the chronological sequence. The action is illustrated in the frame. In some embodiments, the video processing system 100 determines, by the second trained model, a probability of the action falling into one of the stages in the chronological sequence.

In some embodiments, the video processing system 100 divides, by the second trained model, the video into a plurality of segments based on the chronological sequence of stages. In some embodiments, the video processing system 100 predicts, by the second trained model, another action to be performed for completing the task based on the chronological sequence of stages.

Example DNN

Figure 9:
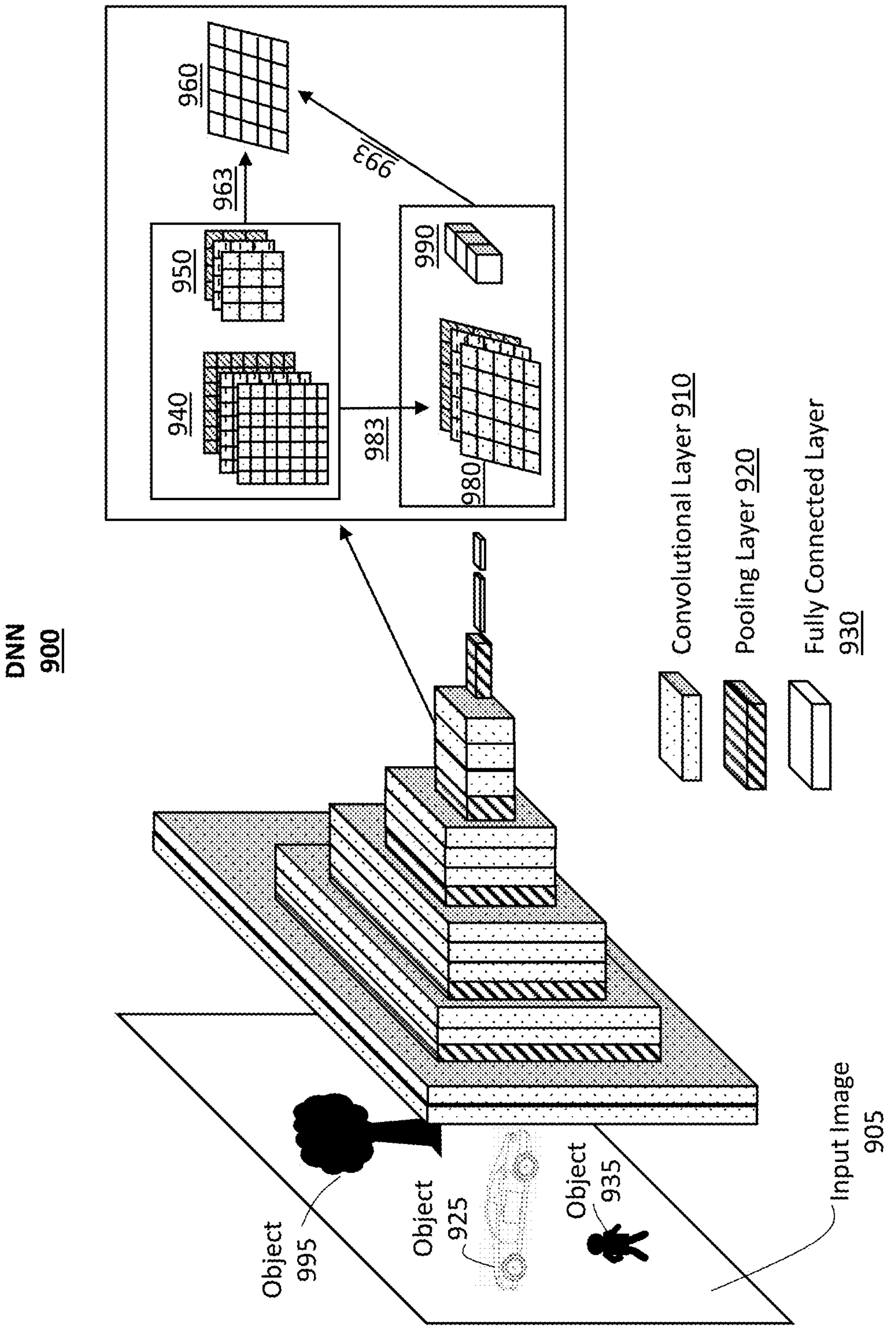
FIG. 9 illustrates an example DNN, in accordance with various embodiments.

FIG. 9 illustrates an example DNN 900, in accordance with various embodiments. For purpose of illustration, the DNN 900 in FIG. 9 is a CNN. In other embodiments, the DNN 900 may be other types of DNNs. The DNN 900 is trained to receive images and output classifications of objects in the images. In the embodiments of FIG. 9, the DNN 900 receives an input image 905 that includes objects 915, 925, and 935. The DNN 900 includes a sequence of layers comprising a plurality of convolutional layers 910 (individually referred to as "convolutional layer 910"), a plurality of pooling layers 920 (individually referred to as "pooling layer 920"), and a plurality of fully connected layers 930 (individually referred to as "fully connected layer 930"). In other embodiments, the DNN 900 may include fewer, more, or different layers. In an inference of the DNN 900, the layers of the DNN 900 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 910 summarize the presence of features in the input image 905. The convolutional layers 910 function as feature extractors. The first layer of the DNN 900 is a convolutional layer 910. In an example, a convolutional layer 910 performs a convolution on an input tensor 940 (also referred to as input feature map (IFM) 940) and a filter 950. As shown in FIG. 9, the IFM 940 is represented by a 7×7×3 three-dimensional (3D) matrix. The IFM 940 includes 3 input channels, each of which is represented by a 7×7 two-dimensional (2D) matrix. The 7×7 2D matrix includes 7 input elements (also referred to as input points) in each row and 7 input elements in each column. The filter 950 is represented by a 3×3×3 3D matrix. The filter 950 includes 3 kernels, each of which may correspond to a different input channel of the IFM 940. A kernel is a 2D matrix of weights, where the weights are arranged in columns and rows. A kernel can be smaller than the IFM. In the embodiments of FIG. 9, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 950 in extracting features from the IFM 940.

The convolution includes MAC operations with the input elements in the IFM 940 and the weights in the filter 950. The convolution may be a standard convolution 963 or a depthwise convolution 983. In the standard convolution 963, the whole filter 950 slides across the IFM 940. All the input channels are combined to produce an output tensor 960 (also referred to as output feature map (OFM) 960). The OFM 960 is represented by a 5×5 2D matrix. The 5×5 2D matrix includes 5 output elements (also referred to as output points) in each row and 5 output elements in each column. For purpose of illustration, the standard convolution includes one filter in the embodiments of FIG. 9. In embodiments where there are multiple filters, the standard convolution may produce multiple output channels in the OFM 960.

The multiplication applied between a kernel-sized patch of the IFM 940 and a kernel may be a dot product. A dot product is the elementwise multiplication between the kernel-sized patch of the IFM 940 and the corresponding kernel, which is then summed, always resulting in a single value. Because it results in a single value, the operation is often referred to as the "scalar product." Using a kernel smaller than the IFM 940 is intentional as it allows the same kernel (set of weights) to be multiplied by the IFM 940 multiple times at different points on the IFM 940. Specifically, the kernel is applied systematically to each overlapping part or kernel-sized patch of the IFM 940, left to right, top to bottom. The result from multiplying the kernel with the IFM 940 one time is a single value. As the kernel is applied multiple times to the IFM 940, the multiplication result is a 2D matrix of output elements. As such, the 2D output matrix (i.e., the OFM 960) from the standard convolution 963 is referred to as an OFM.

In the depthwise convolution 983, the input channels are not combined. Rather, MAC operations are performed on an individual input channel and an individual kernel and produce an output channel. As shown in FIG. 9, the depthwise convolution 983 produces a depthwise output tensor 980. The depthwise output tensor 980 is represented by a 5×5×3 3D matrix. The depthwise output tensor 980 includes 3 output channels, each of which is represented by a 5×5 2D matrix. The 5×5 2D matrix includes 5 output elements in each row and 5 output elements in each column. Each output channel is a result of MAC operations of an input channel of the IFM 940 and a kernel of the filter 950. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 993 is then performed on the depthwise output tensor 980 and a 9×1×3 tensor 990 to produce the OFM 960.

The OFM 960 is then passed to the next layer in the sequence. In some embodiments, the OFM 960 is passed through an activation function. An example activation function is the rectified linear activation function (ReLU). ReLU is a calculation that returns the value provided as input directly, or the value zero if the input is zero or less. The convolutional layer 910 may receive several images as input and calculate the convolution of each of them with each of the kernels. This process can be repeated several times. For instance, the OFM 960 is passed to the subsequent convolutional layer 910 (i.e., the convolutional layer 910 following the convolutional layer 910 generating the OFM 960 in the sequence). The subsequent convolutional layers 910 performs a convolution on the OFM 960 with new kernels and generates a new feature map. The new feature map may also be normalized and resized. The new feature map can be kernelled again by a further subsequent convolutional layer 910, and so on.

In some embodiments, a convolutional layer 910 has 4 hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 910). The convolutional layers 910 may perform various types of convolutions, such as 2-dimensional convolution, dilated or atrous convolution, spatial separable convolution, depthwise separable convolution, transposed convolution, and so on. The DNN 900 includes 96 convolutional layers 910. In other embodiments, the DNN 900 may include a different number of convolutional layers.

The pooling layers 920 down-sample feature maps generated by the convolutional layers, e.g., by summarizing the presence of features in the patches of the feature maps. A pooling layer 920 is placed between 2 convolution layers 910: a preceding convolutional layer 910 (the convolution layer 910 preceding the pooling layer 920 in the sequence of layers) and a subsequent convolutional layer 910 (the convolution layer 910 subsequent to the pooling layer 920 in the sequence of layers). In some embodiments, a pooling layer 920 is added after a convolutional layer 910, e.g., after an activation function (e.g., ReLU) has been applied to the OFM 960.

A pooling layer 920 receives feature maps generated by the preceding convolution layer 910 and applies a pooling operation to the feature maps. The pooling operation reduces the size of the feature maps while preserving their important characteristics. Accordingly, the pooling operation improves the efficiency of the DNN and avoids over-learning. The pooling layers 920 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 920 applied to a feature map of 6×6 results in an output pooled feature map of 3×3. The output of the pooling layer 920 is inputted into the subsequent convolution layer 910 for further feature extraction. In some embodiments, the pooling layer 920 operates upon each feature map separately to create a new set of the same number of pooled feature maps.

The fully connected layers 930 are the last layers of the DNN. The fully connected layers 930 may be convolutional or not. The fully connected layers 930 receive an input operand. The input operand defines the output of the convolutional layers 910 and pooling layers 920 and includes the values of the last feature map generated by the last pooling layer 920 in the sequence. The fully connected layers 930 apply a linear combination and an activation function to the input operand and generate a vector. The vector may contain as many elements as there are classes: element i represents the probability that the image belongs to class i. Each element is therefore between 0 and 9, and the sum of all is worth one. These probabilities are calculated by the last fully connected layer 930 by using a logistic function (binary classification) or a softmax function (multi-class classification) as an activation function.

In some embodiments, the fully connected layers 930 classify the input image 905 and return an operand of size N, where N is the number of classes in the image classification problem. In the embodiments of FIG. 9, N equals 3, as there are 3 objects 915, 925, and 935 in the input image. Each element of the operand indicates the probability for the input image 905 to belong to a class. To calculate the probabilities, the fully connected layers 930 multiply each input element by weight, make the sum, and then apply an activation function (e.g., logistic if N=2, softmax if N>2). This is equivalent to multiplying the input operand by the matrix containing the weights. In an example, the vector includes 3 probabilities: a first probability indicating the object 915 being a tree, a second probability indicating the object 925 being a car, and a third probability indicating the object 935 being a person. In other embodiments where the input image 905 includes different objects or a different number of objects, the individual values can be different.

Example Deep Learning Environment

Figure 10:
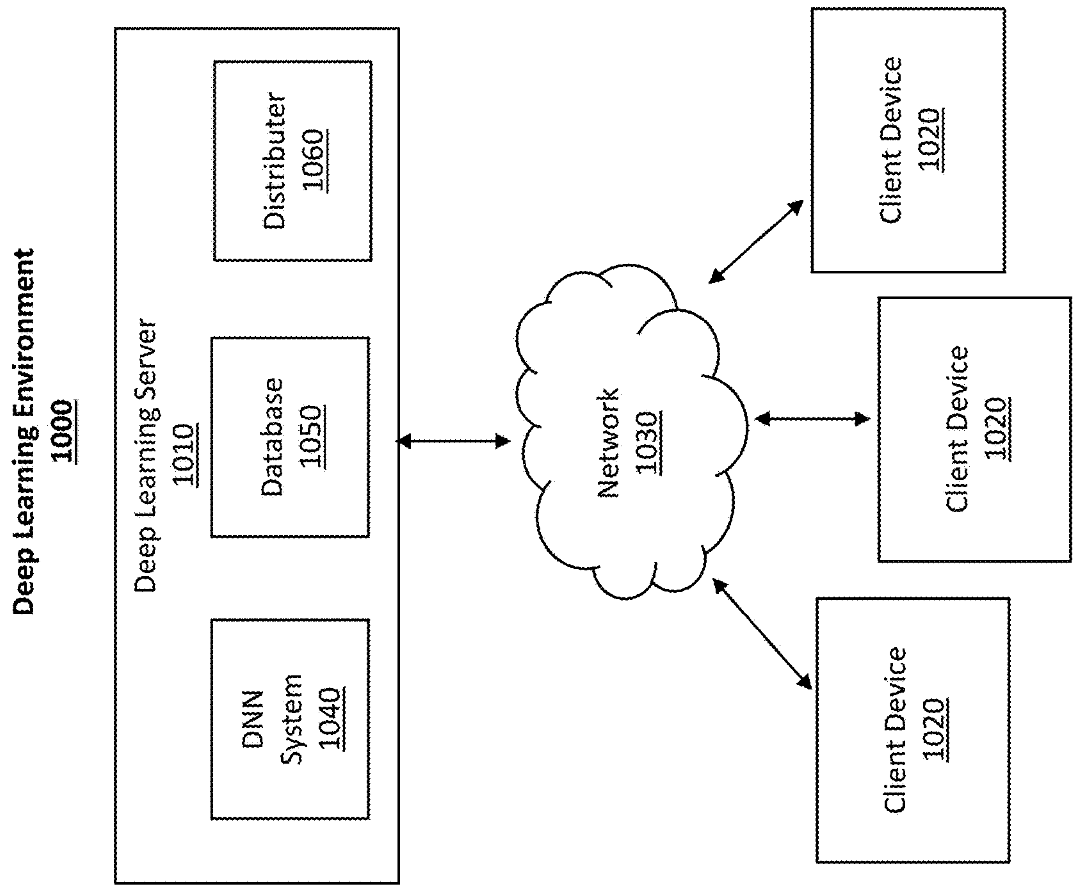
FIG. 10 illustrates a deep learning environment, in accordance with various embodiments.

FIG. 10 illustrates a deep learning environment 1000, in accordance with various embodiments. The deep learning environment 1000 includes a deep learning server 1010 and a plurality of client devices 1020 (individually referred to as client device 1020). The deep learning server 1010 is connected to the client devices 1020 through a network 1030. In other embodiments, the deep learning environment 1000 may include fewer, more, or different components.

The deep learning server 1010 trains deep learning models using neural networks. A neural network is structured like the human brain and consists of artificial neurons, also known as nodes. These nodes are stacked next to each other in 3 types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The deep learning server 1010 can use various types of neural networks, such as DNN, RNN, generative adversarial network (GAN), long short-term memory network (LSTMN), and so on. During the process of training the deep learning models, the neural networks use unknown elements in the input distribution to extract features, group objects, and discover useful data patterns. The deep learning models can be used to solve various problems, e.g., making predictions, classifying images, and so on. The deep learning server 1010 may build deep learning models specific to particular types of problems that need to be solved. A deep learning model is trained to receive an input and outputs the solution to the particular problem.

In FIG. 10, the deep learning server 1010 includes a DNN system 1040, a database 1050, and a distributer 1060. The DNN system 1040 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 900 described above in conjunction with FIG. 9. In some embodiments, the DNN system 1040 trains DNNs through knowledge distillation, e.g., dense-connection based knowledge distillation. The trained DNNs may be used on low memory systems, like mobile phones, IOT edge devices, and so on.

The database 1050 stores data received, used, generated, or otherwise associated with the deep learning server 1010. For example, the database 1050 stores a training dataset that the DNN system 1040 uses to train DNNs. In an embodiment, the training dataset is an image gallery that can be used to train a DNN for classifying images. The training dataset may include data received from the client devices 1020. As another example, the database 1050 stores hyper-parameters of the neural networks built by the deep learning server 1010.

The distributer 1060 distributes deep learning models generated by the deep learning server 1010 to the client devices 1020. In some embodiments, the distributer 1060 receives a request for a DNN from a client device 1020 through the network 1030. The request may include a description of a problem that the client device 1020 needs to solve. The request may also include information of the client device 1020, such as information describing available computing resource on the client device. The information describing available computing resource on the client device 1020 can be information indicating network bandwidth, information indicating available memory size, information indicating processing power of the client device 1020, and so on. In an embodiment, the distributer may instruct the DNN system 1040 to generate a DNN in accordance with the request. The DNN system 1040 may generate a DNN based on the information in the request. For instance, the DNN system 1040 can determine the structure of the DNN and/or train the DNN in accordance with the request.

In another embodiment, the distributer 1060 may select the DNN from a group of pre-existing DNNs based on the request. The distributer 1060 may select a DNN for a particular client device 1020 based on the size of the DNN and available resources of the client device 1020. In embodiments where the distributer 1060 determines that the client device 1020 has limited memory or processing power, the distributer 1060 may select a compressed DNN for the client device 1020, as opposed to an uncompressed DNN that has a larger size. The distributer 1060 then transmits the DNN generated or selected for the client device 1020 to the client device 1020.

In some embodiments, the distributer 1060 may receive feedback from the client device 1020. For example, the distributer 1060 receives new training data from the client device 1020 and may send the new training data to the DNN system 1040 for further training the DNN. As another example, the feedback includes an update of the available computing resource on the client device 1020. The distributer 1060 may send a different DNN to the client device 1020 based on the update. For instance, after receiving the feedback indicating that the computing resources of the client device 1020 have been reduced, the distributer 1060 sends a DNN of a smaller size to the client device 1020.

The client devices 1020 receive DNNs from the distributer 1060 and applies the DNNs to perform machine learning tasks, e.g., to solve problems or answer questions. In various embodiments, the client devices 1020 input images into the DNNs and use the output of the DNNs for various applications, e.g., visual reconstruction, augmented reality, robot localization and navigation, medical diagnosis, weather prediction, and so on. A client device 1020 may be one or more computing devices capable of receiving user input as well as transmitting and/or receiving data via the network 1030. In one embodiment, a client device 1020 is a conventional computer system, such as a desktop or a laptop computer. Alternatively, a client device 1020 may be a device having computer functionality, such as a personal digital assistant (PDA), a mobile telephone, a smartphone, an autonomous vehicle, or another suitable device. A client device 1020 is configured to communicate via the network 1030. In one embodiment, a client device 1020 executes an application allowing a user of the client device 1020 to interact with the deep learning server 1010 (e.g., the distributer 1060 of the deep learning server 1010). The client device 1020 may request DNNs or send feedback to the distributer 1060 through the application. For example, a client device 1020 executes a browser application to enable interaction between the client device 1020 and the deep learning server 1010 via the network 1030. In another embodiment, a client device 1020 interacts with the deep learning server 1010 through an application programming interface (API) running on a native operating system of the client device 1020, such as IOS® or ANDROID™.

In an embodiment, a client device 1020 is an integrated computing device that operates as a standalone network-enabled device. For example, the client device 1020 includes display, speakers, microphone, camera, and input device. In another embodiment, a client device 1020 is a computing device for coupling to an external media device such as a television or other external display and/or audio output system. In this embodiment, the client device 1020 may couple to the external media device via a wireless interface or wired interface (e.g., an HDMI (High-Definition Multimedia Interface) cable) and may utilize various functions of the external media device such as its display, speakers, microphone, camera, and input devices. Here, the client device 1020 may be configured to be compatible with a generic external media device that does not have specialized software, firmware, or hardware specifically for interacting with the client device 1020.

The network 1030 supports communications between the deep learning server 1010 and client devices 1020. The network 1030 may comprise any combination of local area and/or wide area networks, using both wired and/or wireless communication systems. In one embodiment, the network 1030 may use standard communications technologies and/or protocols. For example, the network 1030 may include communication links using technologies such as Ethernet, 10010.11, worldwide interoperability for microwave access (WiMAX), 3G, 4G, code division multiple access (CDMA), digital subscriber line (DSL), etc. Examples of networking protocols used for communicating via the network 1030 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1030 may be represented using any suitable format, such as hypertext markup language (HTML) or extensible markup language (XML). In some embodiments, all or some of the communication links of the network 1030 may be encrypted using any suitable technique or techniques.

Example DNN System

FIG. 11 is a block diagram of an example DNN system 1100, in accordance with various embodiments. The whole DNN system 1100 or a part of the DNN system 1100 may be implemented in the computing device 1400 in FIG. 14. The DNN system 1100 trains DNNs for various tasks, such as image classification, learning relationships between biological cells (e.g., DNA, proteins, etc.), control behaviors for devices (e.g., robots, machines, etc.), and so on. The DNN system 1100 includes an interface module 1110, a training module 1120, a validation module 1130, an inference module 1140, and a memory 1150. In other embodiments, alternative configurations, different or additional components may be included in the DNN system 1100. Further, functionality attributed to a component of the DNN system 1100 may be accomplished by a different component included in the DNN system 1100 or a different system. The DNN system 1100 or a component of the DNN system 1100 (e.g., the training module 1120 or inference module 1140) may include the computing device 1400.

The interface module 1110 facilitates communications of the DNN system 1100 with other systems. For example, the interface module 1110 establishes communications between the DNN system 1100 with an external database to receive data that can be used to train DNNs or input into DNNs to perform tasks. As another example, the interface module 1110 supports the DNN system 1100 to distribute DNNs to other systems, e.g., computing devices configured to apply DNNs to perform tasks.

The training module 1120 trains DNNs by using a training dataset. The training module 1120 forms the training dataset. In an embodiment where the training module 1120 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 1130 to validate performance of a trained DNN. The portion of the training dataset not including the tuning subset and the validation subset may be used to train the DNN.

The training module 1120 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 11, 110, 500, 1100, or even larger.

The training module 1120 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 1120 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 1120 defines the architecture of the DNN, the training module 1120 inputs a training dataset into the DNN. The training dataset includes a plurality of training samples. An example of a training sample includes an object in an image and a ground-truth label of the object. The training module 1120 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 1120 uses a cost function to minimize the error.

The training module 1120 may train the DNN for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 1120 finishes the predetermined number of epochs, the training module 1120 may stop updating the parameters in the DNN. The DNN having the updated parameters is referred to as a trained DNN.

The validation module 1130 verifies accuracy of trained DNNs. In some embodiments, the validation module 1130 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1130 may determine an accuracy score measuring the precision, recall, or a combination of precision and recall of the DNN. The validation module 1130 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1130 may compare the accuracy score with a threshold score. In an example where the validation module 1130 determines that the accuracy score of the augmented model is lower than the threshold score, the validation module 1130 instructs the training module 1120 to re-train the DNN. In one embodiment, the training module 1120 may iteratively re-train the DNN until the occurrence of a stopping condition, such as the accuracy measurement indication that the DNN may be sufficiently accurate, or a number of training rounds having taken place.

The inference module 1140 applies the trained or validated DNN to perform tasks. For instance, the inference module 1140 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 1140 distributes the DNN to other systems, e.g., computing devices in communication with the DNN system 1100, for the other systems to apply the DNN to perform the tasks.

The memory 1150 stores data received, generated, used, or otherwise associated with the DNN system 1100. For example, the memory 1150 stores the datasets used by the training module 1120 and validation module 1130. The memory 1150 may also store data generated by the training module 1120 and validation module 1130, such as the hyperparameters for training DNNs, internal parameters of trained DNNs (e.g., values of tunable parameters of activation functions, such as Fractional Adaptive Linear Units (FALUs)), etc. In the embodiment of FIG. 11, the memory 1150 is a component of the DNN system 1100. In other embodiments, the memory 1150 may be external to the DNN system 1100 and communicate with the DNN system 1100 through a network.

Example Computing Device

Figure 12:
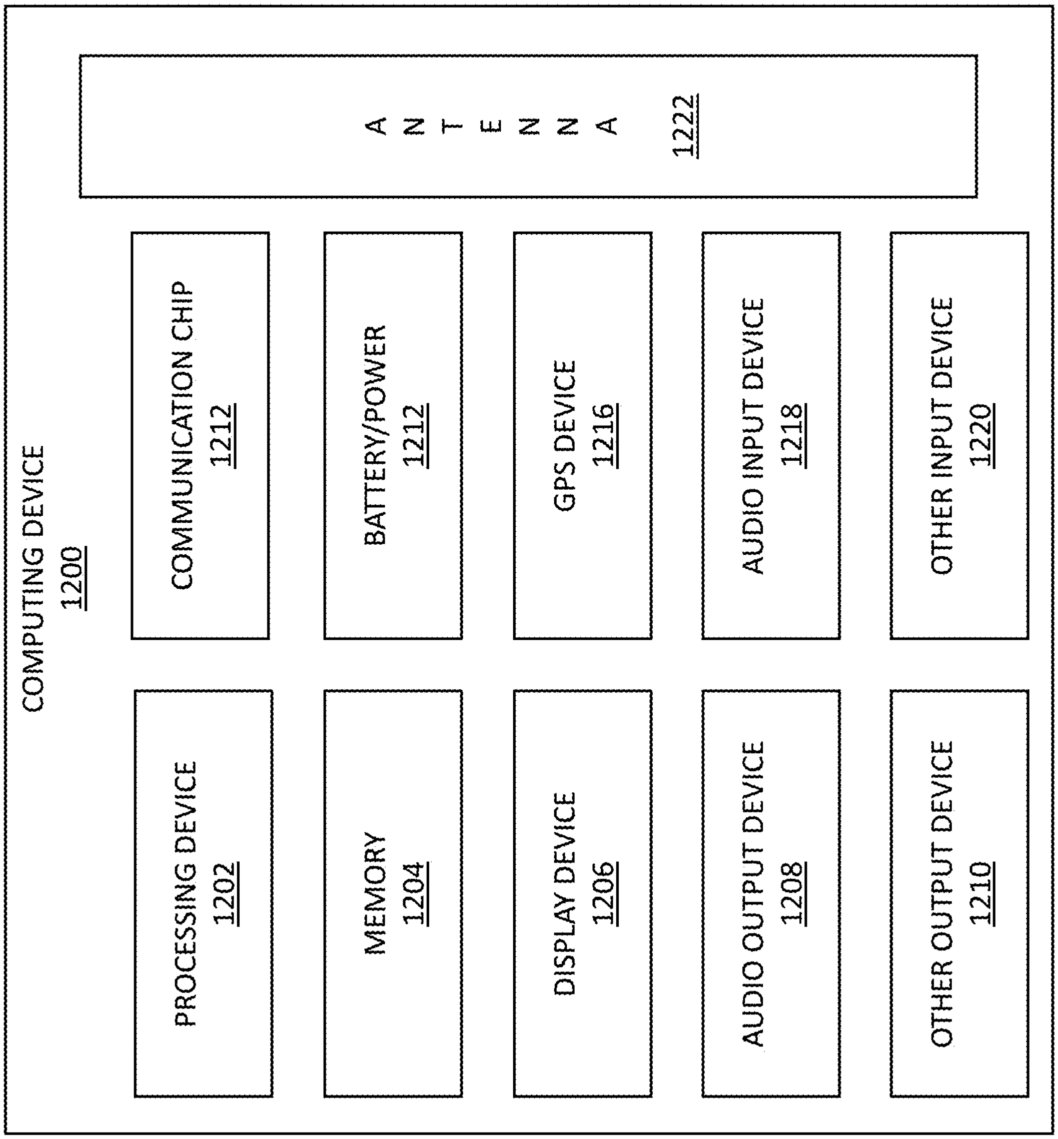
FIG. 12 is a block diagram of an example computing device, in accordance with various embodiments.

FIG. 12 is a block diagram of an example computing device 1200, in accordance with various embodiments. In some embodiments, the computing device 1200 can be used as the DNN system 1100 in FIG. 11. A number of components are illustrated in FIG. 12 as included in the computing device 1200, but any one or more of these components may be omitted or duplicated, as suitable for the application. In some embodiments, some or all of the components included in the computing device 1200 may be attached to one or more motherboards. In some embodiments, some or all of these components are fabricated onto a single system on a chip (SoC) die. Additionally, in various embodiments, the computing device 1200 may not include one or more of the components illustrated in FIG. 12, but the computing device 1200 may include interface circuitry for coupling to the one or more components. For example, the computing device 1200 may not include a display device 1206, but may include display device interface circuitry (e.g., a connector and driver circuitry) to which a display device 1206 may be coupled. In another set of examples, the computing device 1200 may not include an audio input device 1218 or an audio output device 1208, but may include audio input or output device interface circuitry (e.g., connectors and supporting circuitry) to which an audio input device 1218 or audio output device 1208 may be coupled.

The computing device 1200 may include a processing device 1202 (e.g., one or more processing devices). The processing device 1202 processes electronic data from registers and/or memory to transform that electronic data into other electronic data that may be stored in registers and/or memory. The computing device 1200 may include a memory 1204, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1204 may include memory that shares a die with the processing device 1202. In some embodiments, the memory 1204 includes one or more non-transitory computer-readable media storing instructions executable to perform operations for video processing, e.g., the method 800 described above in conjunction with FIG. 8 or some operations performed by the video processing system 100 described above in conjunction with FIG. 1. The instructions stored in the one or more non-transitory computer-readable media may be executed by the processing device 1202.

In some embodiments, the computing device 1200 may include a communication chip 1212 (e.g., one or more communication chips). For example, the communication chip 1212 may be configured for managing wireless communications for the transfer of data to and from the computing device 1200. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1212 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1212 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1212 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1212 may operate in accordance with other wireless protocols in other embodiments. The computing device 1200 may include an antenna 1222 to facilitate wireless communications and/or to receive other wireless communications (such as AM or FM radio transmissions).

In some embodiments, the communication chip 1212 may manage wired communications, such as electrical, optical, or any other suitable communication protocols (e.g., the Ethernet). As noted above, the communication chip 1212 may include multiple communication chips. For instance, a first communication chip 1212 may be dedicated to shorter-range wireless communications such as Wi-Fi or Bluetooth, and a second communication chip 1212 may be dedicated to longer-range wireless communications such as global positioning system (GPS), EDGE, GPRS, CDMA, WiMAX, LTE, EV-DO, or others. In some embodiments, a first communication chip 1212 may be dedicated to wireless communications, and a second communication chip 1212 may be dedicated to wired communications.

The computing device 1200 may include battery/power circuitry 1214. The battery/power circuitry 1214 may include one or more energy storage devices (e.g., batteries or capacitors) and/or circuitry for coupling components of the computing device 1200 to an energy source separate from the computing device 1200 (e.g., AC line power).

The computing device 1200 may include a display device 1206 (or corresponding interface circuitry, as discussed above). The display device 1206 may include any visual indicators, such as a heads-up display, a computer monitor, a projector, a touchscreen display, a liquid crystal display (LCD), a light-emitting diode display, or a flat panel display, for example.

The computing device 1200 may include an audio output device 1208 (or corresponding interface circuitry, as discussed above). The audio output device 1208 may include any device that generates an audible indicator, such as speakers, headsets, or earbuds, for example.

The computing device 1200 may include an audio input device 1218 (or corresponding interface circuitry, as discussed above). The audio input device 1218 may include any device that generates a signal representative of a sound, such as microphones, microphone arrays, or digital instruments (e.g., instruments having a musical instrument digital interface (MIDI) output).

The computing device 1200 may include a GPS device 1216 (or corresponding interface circuitry, as discussed above). The GPS device 1216 may be in communication with a satellite-based system and may receive a location of the computing device 1200, as known in the art.

The computing device 1200 may include another output device 1210 (or corresponding interface circuitry, as discussed above). Examples of the other output device 1210 may include an audio codec, a video codec, a printer, a wired or wireless transmitter for providing information to other devices, or an additional storage device.

The computing device 1200 may include another input device 1220 (or corresponding interface circuitry, as discussed above). Examples of the other input device 1220 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1200 may have any desired form factor, such as a handheld or mobile computer system (e.g., a cell phone, a smart phone, a mobile internet device, a music player, a tablet computer, a laptop computer, a netbook computer, an ultrabook computer, a PDA, an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1200 may be any other electronic device that processes data.

SELECT EXAMPLES

The following paragraphs provide various examples of the embodiments disclosed herein.

Example 1 provides a method for video processing, the method including identifying one or more actions from an instruction for completing a task; generating, by a first trained model, a chronological sequence of stages of the task by inputting the one or more actions into the first trained model, wherein the stages in the chronological sequence have a temporal order, and a completion of a stage preceding another stage according to the temporal order is a prerequisite for occurrence of the another stage; inputting a video into a first layer of a second trained model, the video illustrating an action performed to complete the task; inputting the chronological sequence of stages into a second layer of the second trained model; and classifying, by the second trained model, the action based on the video and the chronological sequence of stages.

Example 2 provides the method of example 1, where classifying the action includes determining, by the second layer of the second trained model, attention weights for a frame in the video based on a timestamp associated with the frame, each attention weight corresponding to a different stage in the chronological sequence, the action illustrated in the frame.

Example 3 provides the method of example 1 or 2, where classifying the action includes determining, by the second trained model, a probability of the action falling into one of the stages in the chronological sequence.

Example 4 provides the method of any of the preceding examples, where the second layer of the second trained model is arranged after the first layer in the second trained model, and the second layer receives features extracted from the video by at least the first layer.

Example 5 provides the method of any of the preceding examples, further including training the first trained model by inputting one or more training samples into the first trained model, each training sample including a sequence of actions performed to complete the task.

Example 6 provides the method of example 5, where the one or more training samples include at least one of the one or more actions.

Example 7 provides the method of example 5 or 6, where the one or more training samples include one or more positive training samples, each positive training sample including a sequence of actions through which the task was completed.

Example 8 provides the method of any one of examples 5-7, where the one or more training samples include one or more negative training samples, each negative training sample including a sequence of actions through which the task was not completed.

Example 9 provides the method of any of the preceding examples, further including dividing, by the second trained model, the video into a plurality of segments based on the chronological sequence of stages.

Example 10 provides the method of any of the preceding examples, further including predicting, by the second trained model, another action to be performed for completing the task based on the chronological sequence of stages.

Example 11 provides one or more non-transitory computer-readable media storing instructions executable to perform operations for video processing, the operations including identifying one or more actions from an instruction for completing a task; generating, by a first trained model, a chronological sequence of stages of the task by inputting the one or more actions into the first trained model, wherein the stages in the chronological sequence have a temporal order, and a completion of a stage preceding another stage according to the temporal order is a prerequisite for occurrence of the another stage; inputting a video into a first layer of a second trained model, the video illustrating an action performed to complete the task; inputting the chronological sequence of stages into a second layer of the second trained model; and classifying, by the second trained model, the action based on the video and the chronological sequence of stages.

Example 12 provides the one or more non-transitory computer-readable media of example 11, where classifying the action includes determining, by the second layer, attention weights for a frame in the video based on a timestamp associated with the frame, each attention weight corresponding to a different stage in the chronological sequence, the action illustrated in the frame.

Example 13 provides the one or more non-transitory computer-readable media of example 11 or 12, where classifying the action includes determining, by the second trained model of the second trained model, a probability of the action falling into one of the stages in the chronological sequence.

Example 14 provides the one or more non-transitory computer-readable media of any one of examples 11-13, where the second layer of the second trained model is arranged after the first layer in the second trained model, and the second layer receives features extracted from the video by at least the first layer.

Example 15 provides the one or more non-transitory computer-readable media of any one of examples 11-14, where the operations further include training the first trained model by inputting one or more training samples into the first trained model, each training sample including a sequence of actions performed to complete the task.

Example 16 provides the one or more non-transitory computer-readable media of example 15, where the one or more training samples include at least one of the one or more actions.

Example 17 provides the one or more non-transitory computer-readable media of example 15 or 16, where the one or more training samples include one or more positive training samples, each positive training sample including a sequence of actions through which the task was completed.

Example 18 provides the one or more non-transitory computer-readable media of any one of examples 15-17, where the one or more training samples include one or more negative training samples, each negative training sample including a sequence of actions through which the task was not completed.

Example 19 provides the one or more non-transitory computer-readable media of any one of examples 11-18, where the operations further include dividing, by the second trained model, the video into a plurality of segments based on the chronological sequence of stages Example 20 provides the one or more non-transitory computer-readable media of any one of examples 11-19, where the operations further include predicting, by the second trained model, another action to be performed for completing the task based on the chronological sequence of stages.

Example 21 provides an apparatus for video processing, the apparatus including a computer processor for executing computer program instructions; and a non-transitory computer-readable memory storing computer program instructions executable by the computer processor to perform operations including identifying one or more actions from an instruction for completing a task, generating, by a first trained model, a chronological sequence of stages of the task by inputting the one or more actions into the first trained model, wherein the stages in the chronological sequence have a temporal order, and a completion of a stage preceding another stage according to the temporal order is a prerequisite for occurrence of the another stage, inputting a video into a first layer of a second trained model, the video illustrating an action performed to complete the task, inputting the chronological sequence of stages into a second layer of the second trained model, and classifying, by the second trained model, the action based on the video and the chronological sequence of stages.

Example 22 provides the apparatus of example 21, where classifying the action includes determining, by the second layer of the second trained model, attention weights for a frame in the video based on a timestamp associated with the frame, each attention weight corresponding to a different stage in the chronological sequence, the action illustrated in the frame.

Example 23 provides the apparatus of example 21 or 22, where classifying the action includes determining, by the second trained model, a probability of the action falling into one of the stages in the chronological sequence.

Example 24 provides the apparatus of any one of examples 21-23, where the operations further include training the first trained model by inputting one or more training samples into the first trained model, each training sample including a sequence of actions performed to complete the task.

Example 25 provides the apparatus of example 24, where the one or more training samples include one or more positive training samples, each positive training sample including a sequence of actions through which the task was completed; and one or more negative training samples, each negative training sample including a sequence of actions through which the task was not completed.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method for video processing, comprising:

identifying one or more actions from an instruction for completing a task;

generating, by a first neural network, a chronological sequence of stages of the task by inputting the one or more actions into the first neural network, wherein the stages in the chronological sequence have a temporal order, and a completion of a stage preceding another stage according to the temporal order is a prerequisite for occurrence of the another stage;

inputting a video into a first layer of a second neural network, the video illustrating an action performed to complete the task;

inputting the chronological sequence of stages into a second layer of the second neural network, wherein the second layer is a hidden layer of the second neural network and is subsequent to the first layer in the second neural network; and classifying, by the second neural network, the action based on the video and the chronological sequence of stages.

2. The method of claim 1, wherein classifying the action comprises:

determining, by the second layer of the second neural network, attention weights for a frame in the video based on a timestamp associated with the frame, each attention weight corresponding to a different stage in the chronological sequence, the action illustrated in the frame.

3. The method of claim 1, wherein classifying the action comprises:

determining, by the second neural network, a probability of the action falling into one of the stages in the chronological sequence.

4. The method of claim 1, wherein the second layer further receives features generated by one or more other layers of the second neural network based on the video.

5. The method of claim 1, further comprising:

training the first neural network by inputting one or more training samples into the first neural network, each training sample comprising a sequence of actions performed to complete the task.

6. The method of claim 5, wherein the one or more training samples comprise a training sample including at least one of the one or more actions.

7. The method of claim 5, wherein the one or more training samples comprise one or more positive training samples, each positive training sample comprising a sequence of actions through which the task was completed.

8. The method of claim 5, wherein the one or more training samples comprise one or more negative training samples, each negative training sample comprising a sequence of actions through which the task was not completed.

9. The method of claim 1, further comprising:

dividing, by the second neural network, the video into a plurality of segments based on the chronological sequence of stages.

10. The method of claim 1, further comprising:

predicting, by the second neural network, another action to be performed for completing the task based on the chronological sequence of stages.

11. One or more non-transitory computer-readable media storing instructions executable to perform operations for video processing, the operations comprising:

identifying one or more actions from an instruction for completing a task;

generating, by a first neural network, a chronological sequence of stages of the task by inputting the one or more actions into the first neural network, wherein the stages in the chronological sequence have a temporal order, and a completion of a stage preceding another stage according to the temporal order is a prerequisite for occurrence of the another stage;

inputting a video into a first layer of a second neural network, the video illustrating an action performed to complete the task;

inputting the chronological sequence of stages into a second layer of the second neural network, wherein the second layer is a hidden layer of the second neural network and is subsequent to the first layer in the second neural network; and classifying, by the second neural network, the action based on the video and the chronological sequence of stages.

12. The one or more non-transitory computer-readable media of claim 11, wherein classifying the action comprises:

determining, by the second layer of the second neural network, attention weights for a frame in the video based on a timestamp associated with the frame, each attention weight corresponding to a different stage in the chronological sequence, the action illustrated in the frame.

13. The one or more non-transitory computer-readable media of claim 11, wherein classifying the action comprises:

determining, by the second neural network, a probability of the action falling into one of the stages in the chronological sequence.

14. The one or more non-transitory computer-readable media of claim 11, wherein the second layer further receives features generated by one or more other layers of the second neural network based on the video.

15. The one or more non-transitory computer-readable media of claim 11, wherein the operations further comprise:

training the first neural network by inputting one or more training samples into the first neural network, each training sample comprising a sequence of actions performed to complete the task.

16. The one or more non-transitory computer-readable media of claim 15, wherein the one or more training samples comprise a training sample including at least one of the one or more actions.

17. The one or more non-transitory computer-readable media of claim 15, wherein the one or more training samples comprise one or more positive training samples, each positive training sample comprising a sequence of actions through which the task was completed.

18. The one or more non-transitory computer-readable media of claim 15, wherein the one or more training samples comprise one or more negative training samples, each negative training sample comprising a sequence of actions through which the task was not completed.

19. The one or more non-transitory computer-readable media of claim 11, wherein the operations further comprise:

dividing, by the second neural network, the video into a plurality of segments based on the chronological sequence of stages.

20. The one or more non-transitory computer-readable media of claim 11, wherein the operations further comprise:

predicting, by the second neural network, another action to be performed for completing the task based on the chronological sequence of stages.

21. An apparatus for video processing, the apparatus comprising:

a computer processor for executing computer program instructions; and a non-transitory computer-readable memory storing computer program instructions executable by the computer processor to perform operations comprising:

identifying one or more actions from an instruction for completing a task, generating, by a first neural network, a chronological sequence of stages of the task by inputting the one or more actions into the first neural network, wherein the stages in the chronological sequence have a temporal order, and a completion of a stage preceding another stage according to the temporal order is a prerequisite for occurrence of the another stage, inputting a video into a first layer of a second neural network, the video illustrating an action performed to complete the task, inputting the chronological sequence of stages into a second layer of the second neural network, wherein the second layer is a hidden layer of the second neural network and is subsequent to the first layer in the second neural network, and classifying, by the second neural network, the action based on the video and the chronological sequence of stages.

22. The apparatus of claim 21, wherein classifying the action comprises:

determining, by the second layer of the second neural network, attention weights for a frame in the video based on a timestamp associated with the frame, each attention weight corresponding to a different stage in the chronological sequence, the action illustrated in the frame.

23. The apparatus of claim 21, wherein classifying the action comprises:

determining, by the second neural network, a probability of the action falling into one of the stages in the chronological sequence.

24. The apparatus of claim 21, wherein the operations further comprise:

training the first neural network by inputting one or more training samples into the first neural network, each training sample comprising a sequence of actions performed to complete the task.

25. The apparatus of claim 24, wherein the one or more training samples comprise:

one or more positive training samples, each positive training sample comprising a sequence of actions through which the task was completed; and one or more negative training samples, each negative training sample comprising a sequence of actions through which the task was not completed.

* * * * *